United States Patent
Kim

(10) Patent No.: US 10,088,196 B2
(45) Date of Patent: Oct. 2, 2018

(54) HEAT EXCHANGER

(71) Applicant: Kyungdong Navien Co., Ltd., Pyeongtaek, Gyeonggi-Do (KR)

(72) Inventor: Young Mo Kim, Gyeonggi-do (KR)

(73) Assignee: Kyungdong Navien Co., Ltd., Pyeongtaek, Gyeonggi-do (KR)

( * ) Notice: Subject to any disclaimer, the term of this patent is extended or adjusted under 35 U.S.C. 154(b) by 52 days.

(21) Appl. No.: 15/258,327

(22) Filed: Sep. 7, 2016

(65) Prior Publication Data

US 2017/0059203 A1    Mar. 2, 2017

Related U.S. Application Data

(63) Continuation of application No. PCT/KR2015/002458, filed on Mar. 13, 2015.

(30) Foreign Application Priority Data

Mar. 18, 2014 (KR) ........................ 10-2014-0031440

(51) Int. Cl.
  *F24H 8/00* (2006.01)
  *F24H 1/38* (2006.01)
  (Continued)

(52) U.S. Cl.
  CPC .............. *F24H 1/38* (2013.01); *F24H 8/00* (2013.01); *F24H 9/001* (2013.01); *F24H 9/122* (2013.01); *F28D 9/0012* (2013.01); *F28D 9/0043* (2013.01); *F28D 9/0093* (2013.01); *F28F 3/044* (2013.01); *F28F 3/046* (2013.01); *F28F 3/08* (2013.01); *F28F 9/02* (2013.01); *F28F 9/0224* (2013.01); *F28F 9/0243* (2013.01); *F28F 9/26* (2013.01); *F28F 13/12* (2013.01);
  (Continued)

(58) Field of Classification Search
  CPC ... F24H 8/00; F24H 1/38; F24H 9/001; F24H 1/208; F24H 1/30; F24H 9/0015; F24H 9/18; F28D 9/0043; F28D 2021/0024; F28D 21/0007; F28D 9/0012; F28D 7/1607; F28D 7/1623; F28D 9/0037; F28D 9/005; Y10T 29/4935; F27D 17/004; F28B 1/02
  See application file for complete search history.

(56) References Cited

U.S. PATENT DOCUMENTS 6,832,647 B2 * 12/2004 Voss ..................... B01D 5/0015
                                                                    165/111
7,302,916 B2 * 12/2007 LeMer ..................... F24H 1/43
                                                                    122/15.1
(Continued)

FOREIGN PATENT DOCUMENTS

JP    2006-214628 A    8/2006
KR  10-2010-0087620 A  8/2010
(Continued)

*Primary Examiner* — Gregory A Wilson
(74) *Attorney, Agent, or Firm* — Mintz Levin Cohn Ferris Glovsky and Popeo, P.C.; Kongsik Kim; Carolina Säve

(57) ABSTRACT

A heat exchanger comprising a mixture inflow unit into which a mixture of air and fuel is introduced, a burner for combusting the mixture introduced through the mixture inflow unit, a heat exchange unit that is disposed around the burner, and a combustion gas discharge unit for discharging the combustion gas having passed through the heat exchange unit is provided.

17 Claims, 20 Drawing Sheets

(51) Int. Cl.
    *F28F 3/04*    (2006.01)
    *F28F 9/02*    (2006.01)
    *F28F 9/26*    (2006.01)
    *F28D 9/00*    (2006.01)
    *F24H 9/00*    (2006.01)
    *F24H 9/12*    (2006.01)
    *F28F 3/08*    (2006.01)
    *F28F 13/12*   (2006.01)

(52) U.S. Cl.
    CPC ... *F28F 2009/0287* (2013.01); *F28F 2270/00* (2013.01); *Y02B 30/102* (2013.01)

(56) References Cited

U.S. PATENT DOCUMENTS

| | | | | |
|---|---|---|---|---|
| 7,617,802 | B2* | 11/2009 | Le Mer | F24H 1/43 |
| | | | | 122/15.1 |
| 9,353,967 | B2* | 5/2016 | Ahmady | F24H 1/18 |
| 9,476,610 | B2* | 10/2016 | Le Mer | F24H 1/43 |
| 2015/0338127 | A1* | 11/2015 | Kim | F23L 15/00 |
| | | | | 122/18.4 |
| 2016/0377319 | A1* | 12/2016 | Kim | F24H 1/165 |
| | | | | 122/18.31 |

FOREIGN PATENT DOCUMENTS

| | | |
|---|---|---|
| KR | 10-2012-0045249 A | 5/2012 |
| KR | 10-2013-0052912 A | 5/2013 |

* cited by examiner

PRIOR ART

HEAT EXCHANGER

CROSS-REFERENCE TO RELATED APPLICATIONS

This application is a continuation application of International Application No. PCT/KR2015/002458 filed on Mar. 13, 2015, which claims priority to Korean Application No. 10-2014-0031440 filed on Mar. 18, 2014. The applications are incorporated herein by reference.

TECHNICAL FIELD

The present disclosure relates to a heat exchanger provided in a boiler for heating or hot water, and more particularly, to a heat exchanger improving heat transfer efficiency between a heating medium and combustion gas, and also having a simplified structure by stacking a unit plate manufactured in a constant pattern to integrally form a heating medium passage, a combustion gas passage, and a combustion gas discharge passage.

BACKGROUND ART

A boiler for heating or hot water is a device for applying heat to heating water or direct water (hereinafter, referred to as a 'heating medium') by a heat source to heat a desired zone or supply hot water, and is configured to include a burner for burning a mixture of gas and air, and a heat exchanger for transferring combustion heat of combustion gas to the heating medium.

A boiler produced in the early days employed a heat exchanger of heating a heating medium using only sensible heat generated upon combustion of a burner, whereas a boiler produced recently is a condensing boiler designed to improve thermal efficiency, which is provided with a sensible heat exchanger for absorbing sensible heat of combustion gas generated in a combustion chamber and a latent heat exchanger for absorbing latent heat generated upon condensation of water vapor that is contained in the combustion gas undergone heat exchange in the sensible heat exchanger. Such a condensing boiler is commercialized in an oil boiler as well as a gas boiler to thereby contribute much to an increase of boiler efficiency and fuel expenses reduction.

As described above, a conventional heat exchanger of a condensing type configured with a sensible heat exchanger and a latent heat exchanger has a structure in which an air blower, a fuel supply nozzle, and a burner are typically installed at an upper part of a housing, and the sensible heat exchanger and the latent heat exchanger, in which heat exchange fins are coupled to an outside of a heat exchange pipe, are sequentially installed inside the housing below the burner.

However, such a heat exchanger of a condensing type has a problem in that a dimension of the heat exchanger should be increased due to the structure in which the air blower is located at the upper part of the housing and the sensible heat exchanger and the latent heat exchanger are longitudinally located inside the housing.

As the prior art for addressing such a problem, minimizing the dimension and improving heat exchange efficiency, a heat exchanger is disclosed in Korean Patent Registered Nos. 10-1321708, 10-0581578, and 10-0813807, wherein the heat exchanger is configured with a burner located at a center thereof and a heat exchange pipe wound on a circumference of the burner in a coil shape.

FIG. 1 shows a cross-sectional view of a heat exchanger of a condensing boiler disclosed in Korean Patent Registered No. 10-0813807. A heat exchanger 40 shown in FIG. 1 is configured to include a burner 10 installed to discharge downward combustion gas, a heat exchange pipe 20 wound on a circumference of the burner 10 in a coil shape so as to heat water suppled inside the heat exchanger 40 to a desired temperature by heat generated at the burner 10 to thereby provide the heated water as heating water or hot water, and a partition wall 30 installed at a lower side of the heat exchange pipe 20 in a horizontal direction to form a passage of combustion gas. As shown in FIG. 1, the heat exchange pipe 20 is arranged to have an inclined surface 21 that is inclined from an outside of a body to an inside thereof by a predetermined angle to be directed to a central direction of the burner 10, and one end of a connecting pipe 33 is connected to and installed at a body of the partition wall 30, which forms a communication hole 32 thereinside, thereby connecting one side of the heat exchange pipe 20 to the other side thereof through the other end of the connecting pipe 33.

However, the heat exchanger disclosed in the prior art documents has a disadvantage in which a torsional phenomenon occurs while the heat exchange pipe is helically processed to cause a difficulty in processing an entire surface of the heat exchange pipe in a uniform shape.

Also, when a heat exchange pipe is undergone a bending process, damage may occur upon the bending process due to a difference of a strain rate between an inside surface of the heat exchange pipe toward a center of a burner and an outside surface thereof opposite the inside surface, and thus the heat exchange pipe exchanging heat with combustion gas may have a limitation to be formed in a wider width. As a result, there is a structural limitation in which a sufficient area for processing an irregular shape promoting a turbulent flow on a surface of a heat exchange pipe is not secured as a configuration for more improving heat transfer efficiency between a heating medium and combustion gas.

In addition, the conventional heat exchanger has problems in that an installation structure of the heat exchanger is complicated because a housing H is separately provided as a configuration for tightly sealing an outer circumference of the heat exchange pipe 20 being helically wound, and a heat source of combustion gas is not fully transferred to a heating medium flowing inside the heat exchange pipe 20 because heat transferred to the housing H is directly radiated and dissipated to an outside thereof, wherein the heat is transferred to the housing H while the combustion gas generated by combustion of the burner 10 passes a longitudinally separated space of the heat exchange pipe 20 to flow through a space between the heat exchange pipe 20 and an inner wall of the housing H.

Additionally, the conventional heat exchanger has problems in that heat generated by the combustion of the burner 10 is transferred to a plate 11 for fixing the burner 10 to thereby cause an overheating, and also an insulating material or a heat dissipation fin at an outside of the plate 11 should be additionally provided in order to prevent such an overheating such that a complicated structure and a heat loss are induced.

SUMMARY

To address the above described problems, an object of the present disclosure is to provide a heat exchanger capable of securing a large heat transfer area between a heating medium and combustion gas by forming a flow channel of the heating medium to be long in a restricted space, and also maximizing thermal efficiency by promoting generation of a turbulent flow in the flow of the heating medium and the combustion gas.

Another object of the present disclosure is to provide a heat exchanger capable of reducing the number of components configuring the heat exchanger and simplifying a coupling structure, by integrally configuring a heating medium passage, a combustion gas passage, and an outer wall structure for tightly sealing outside surfaces of the heating medium passage and the combustion gas passage.

Still another object of the present disclosure is to provide a heat exchanger capable of more improving thermal efficiency by maximizing a collection of combustion heat of combustion gas into a heating medium, wherein the combustion heat is discharged through a combustion gas discharge passage.

To realize the above described objects, a heat exchanger of the present disclosure includes a mixture inflow unit 100 in which a mixture of air and fuel flows; a burner 200 configured to burn the mixture flowing in through the mixture inflow unit 100; heat exchange units 300 and 400 provided at a circumference of the burner 200, configured to exchange heat between combustion gas generated by combustion of the burner 200 and a heating medium, and configured with a plurality of unit plates being longitudinally stacked; and a combustion gas discharge unit 500 configured to discharge combustion gas that passed the heat exchange units 300 and 400, wherein, in an inside of each of the plurality of unit plates that are stacked to configure the heat exchange units 300 and 400, a heating medium passage P1 and a combustion gas passage P2 are separated from each other and longitudinally and alternately formed to be adjacent to each other, and a combustion gas discharge passage P3 is formed to connect the combustion gas passage P2 to the combustion gas discharge unit 500.

In this case, each of the plurality of unit plates may be configured with a first plate and a second plate which are longitudinally stacked, the first plate may include a first plane portion A1 in which a first through hole B1 is formed at a central part thereof; a first flange portion C1 formed to extend from an edge of the first plane portion A1 to an upper side thereof to be bent to an outward side thereof; and a passage forming protruding portion D1 formed to be convex upward at a region between the edge of the first plane portion A1 and the first through hole B1, and the second plate may include a second plane portion A2 in which a second through hole B2 of a shape corresponding to that of the first through hole B1 is formed at a central part of the second plane portion A2, and having an upper surface coming into tight contact with a bottom surface of the first plane portion A1; a second flange portion C2 formed to extend from an edge of the second plane portion A2 to a lower side thereof to be bent to an outward side thereof, and coupled to a flange portion C1 of a unit plate being located below the second plate; and a passage forming depressed portion D2 formed to be concave downward at a region between the edge of the second plane portion A2 and the second through hole B2, thereby forming the heating medium passage P1 between the passage forming protruding portion D1 and the passage forming depressed portion D2.

The first flange portion C1 may be formed to be higher than a protruding height of the passage forming protruding portion D1, and the second flange portion C2 may be formed to be deeper than a depressed depth of the passage forming depressed portion D2, and thus a longitudinally separated space, which forms the combustion gas passage P2, may be provided between a lower end of a passage forming depressed portion D2 of a unit plate being located at an upper group among unit plates that are longitudinally located to be adjacent to each other, and an upper end of a passage forming protruding portion D1 of a unit plate being located at a lower group thereamong.

A plurality of gap maintaining protruding portions E1, each of which protrudes at the same height as that of the first flange portion C1, may be formed to be spaced apart from each other at the passage forming protruding portion D1 in a circumferential direction, and a plurality of gap maintaining depressed portions E2, each of which is depressed at the same depth as that of the second flange portion C2, may be formed to be spaced apart from each other at the passage forming depressed portion D2 in the circumferential direction, and thus a lower end of each of the plurality of gap maintaining depressed portions E2 of a unit plate being located at the upper group among the unit plates being longitudinally located to be adjacent to each other, and an upper end of each of the plurality of gap maintaining protruding portions E1 of a unit plate being located at the lower group thereamong may come into contact with each other.

A combustion gas outlet F1 may be formed at the edge of the first plane portion A1 to provide the combustion gas discharge passage P3, and a combustion gas outlet F2 may be formed at a position, which longitudinally corresponds to the combustion gas outlet F1, on the edge of the second plane portion A2, and thus combustion gas, which passed the combustion gas passage P2, may sequentially pass the combustion gas outlets F1 and F2 which are formed at each of the unit plates being longitudinally arranged, thereby flowing toward the combustion gas discharge unit 500.

A turbulent flow forming portion G having an irregular shape may be formed at the passage forming protruding portion D1 or the passage forming depressed portion D2.

In this case, a protruding upper end and a depressed lower end of the turbulent flow forming portion G may come into contact with each other inside the heating medium passage P1 and the combustion gas passage P2.

As one embodiment, the passage forming protruding portion D1 may be formed to be communicated with an entire section at a region between the edge of the first plane portion A1 and the first through hole B1 along the circumferential direction, the passage forming depressed portion D2 may be formed to be communicated with an entire section at a region between the edge of the second plane portion A2 and the second through hole B2 along the circumferential direction, and a through hole may be formed at each of the plurality of gap maintaining protruding portions E1 and each of the plurality of gap maintaining depressed portions E2 so as to connect a heating medium passage P1 of the unit plate located at the lower group to a heating medium passage P1 of the unit plate located at the upper group, wherein the through hole may be located so as to reverse a direction of the heating medium passage P1 of the unit plate located at the lower group against that of the heating medium passage P1 of the unit plate located at the upper group.

A heating medium, which flows in through a through hole formed at one side of a second plate configuring the unit plate located at the lower group among the unit plates being longitudinally located to be adjacent to each other, may be branched off to both directions to flow along the heating medium passage P1, and then pass a through hole formed at a first plate being located at an opposite side against the second plate and a through hole formed at a second plate configuring a unit plate being located at the upper group, thereby flowing in a heating medium passage P1 of the unit plate being located at the upper group.

As another embodiment, the passage forming protruding portion D1 may be formed to be communicated with some section at a region between the edge of the first plane portion A1 and the first through hole B1 along the circumferential direction, the passage forming depressed portion D2 may be formed to be communicated with some section at a region between the edge of the second plane portion A2 and the second through hole B2 along the circumferential direction, and a through hole may be formed at each of the plurality of gap maintaining protruding portions E1 and each of the plurality of gap maintaining depressed portions E2 so as to connect a heating medium passage P1 of the unit plate located at the lower group to a heating medium passage P1 of the unit plate located at the upper group, wherein the through hole may be located so as to reverse a direction of the heating medium passage P1 of the unit plate located at the lower group against that of the heating medium passage P1 of the unit plate located at the upper group.

A heating medium, which flows in through a through hole formed at one side of a second plate configuring the unit plate located at the lower group among the unit plates being longitudinally located to be adjacent to each other, may flow in one direction along the heating medium passage P1, and then pass a through hole formed at a first plate being located at an opposite side against the second plate and a through hole formed at a second plate configuring a unit plate being located at the upper group, thereby flowing in a heating medium passage P1 of the unit plate being located at the upper group.

In the above described embodiments, multiple heating medium passages P1 may be configured in parallel with each other by stacking the unit plate.

The heat exchange units 300 and 400 may be configured with a sensible-heat exchange unit 300 configured to absorb sensible heat of the combustion gas generated by the combustion of the burner 200, and a latent-heat exchange unit 400 configured to absorb latent heat of water vapor contained in the combustion gas being undergone heat exchange in the sensible-heat exchange unit 300, and a heat isolator 390 may be provided between the sensible-heat exchange unit 300 and the latent-heat exchange unit 400 to spatially separate the sensible-heat exchange unit 300 and the latent-heat exchange unit 400 from each other, and thus the combustion gas generated by the combustion of the burner 200 may pass the combustion gas passage P2 of the sensible-heat exchange unit 300 to flow in a radially outward direction, and then pass the combustion gas passage P2 of the latent-heat exchange unit 400 after passing the combustion gas discharge passage P3 to flow in a radially inward direction, thereby being discharged to the combustion gas discharge unit 500.

The heat isolator 390 may include a heating medium filled between an upper cover panel 390a and a lower cover panel 390b which are longitudinally stacked; and an insulating material 390c stacked on the upper cover panel 390a.

The unit plate may be arranged to surround the circumference of the burner 200 in a polygonal shape, a circular shape, or an oval shape.

A heating medium connecting passage P may be formed at a lateral circumferential surface of an upper part of the burner 200, wherein the heating medium connecting passage P may be connected to a heating medium passage P1 located at the upper part of the burner 200, thereby allowing the heating medium to pass the heating medium connecting passage P.

In accordance with the heat exchanger of the present disclosure, thermal efficiency may be maximized by stacking a plurality of unit plates manufactured in a similar pattern to form a heating medium passage and a combustion gas passage which are separately and alternately arranged to be adjacent to each other in an inner space of the stacked unit plates, forming a flow channel of the heating medium to be long at maximum length in a restricted space, and configuring a turbulent flow forming portion, which promotes generation of a turbulent flow in the flow of the heating medium and the combustion gas, to be formed at a large area on a surface of each of the unit plates.

Also, in accordance with the present disclosure, a heating medium passage, a combustion gas passage, and the structure of an outer wall for tightly sealing outside surfaces of the heating medium passage and the combustion gas passage, through which combustion gas passes, are integrally formed inside a heat exchanger that is configured by stacking a plurality of unit plates, such that the number of components configuring the heat exchanger may be reduced to simplify an installation structure, and also heat of combustion gas transferred to the outer wall in the integral structure is retransferred to a heating medium by a conducting method, thereby more improving thermal efficiency.

In addition, a plurality of unit plates are multiply stacked to configure multiple heating medium passages in parallel with each other such that a pressure loss may be minimized, a separate connection component may not be needed, and a part for connecting the heating medium passages to each other may be used as a heat exchange area.

Additionally, deformation of a unit plate due to a pressure of a heating medium may be prevented and pressure resistance performance of the unit plate may be improved by contacting and welding a shape for forming a turbulent flow to an inside of each of a heating medium passage and a combustion gas passage.

Further, a heating medium passage and a combustion gas passage are configured to connect to a unit plate, respectively, so that heat exchange may be performed through an entire unit plate, thereby more improving thermal efficiency. Moreover, a passage through which a heating medium passes may be formed at a lateral surface of an upper part of a burner, thereby preventing a burner support plate from being overheated and more improving thermal efficiency.

Furthermore, heat insulation efficiency between a sensible heat exchange portion and a latent heat exchange portion may be increased by allowing a heating medium to pass a space between plates configuring a heat isolator that is located between the sensible heat exchange portion and the latent heat exchange portion.

DETAILED DESCRIPTION

Figure 1:
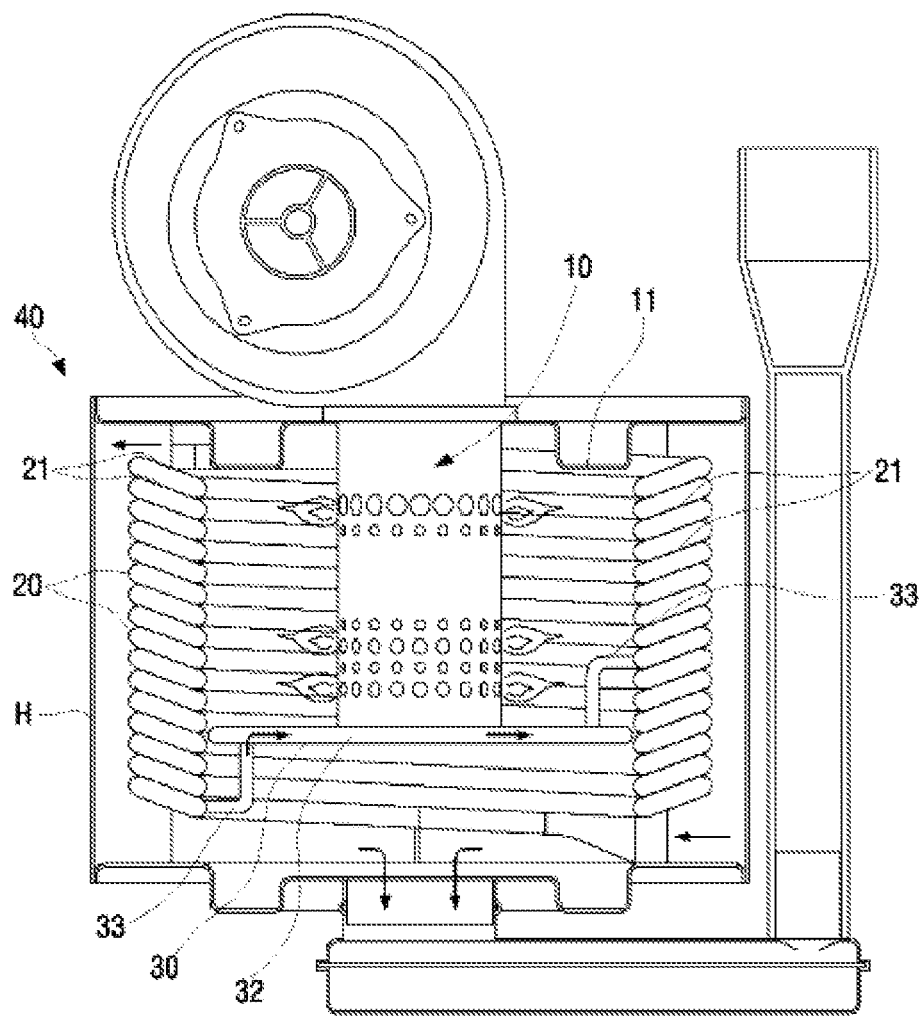
FIG. 1 is a cross-sectional view of a heat exchanger in which a heat exchange pipe is helically installed at a circumference of a conventional burner.
Figure 2:
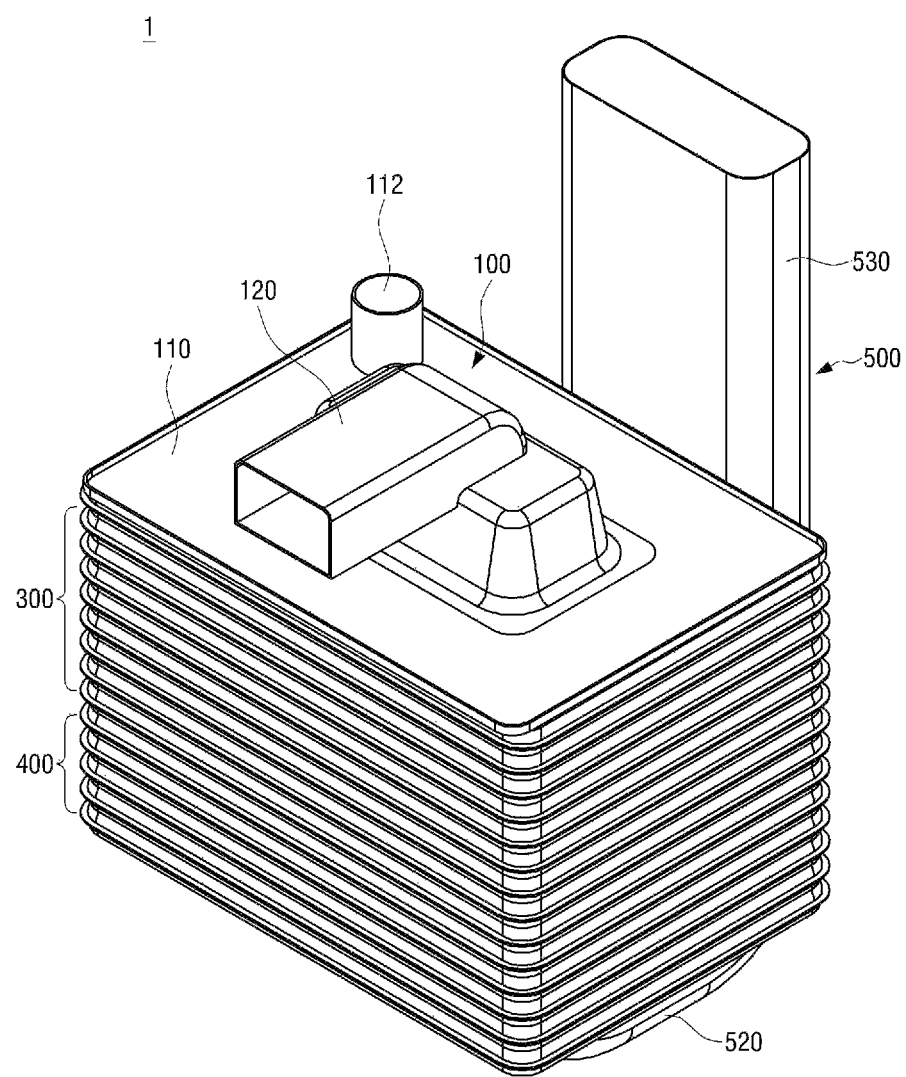
FIGS. 2 and 3 are perspective views of a heat exchanger according to one embodiment of the present disclosure when viewed from upper and lower sides, respectively.
Figure 3:
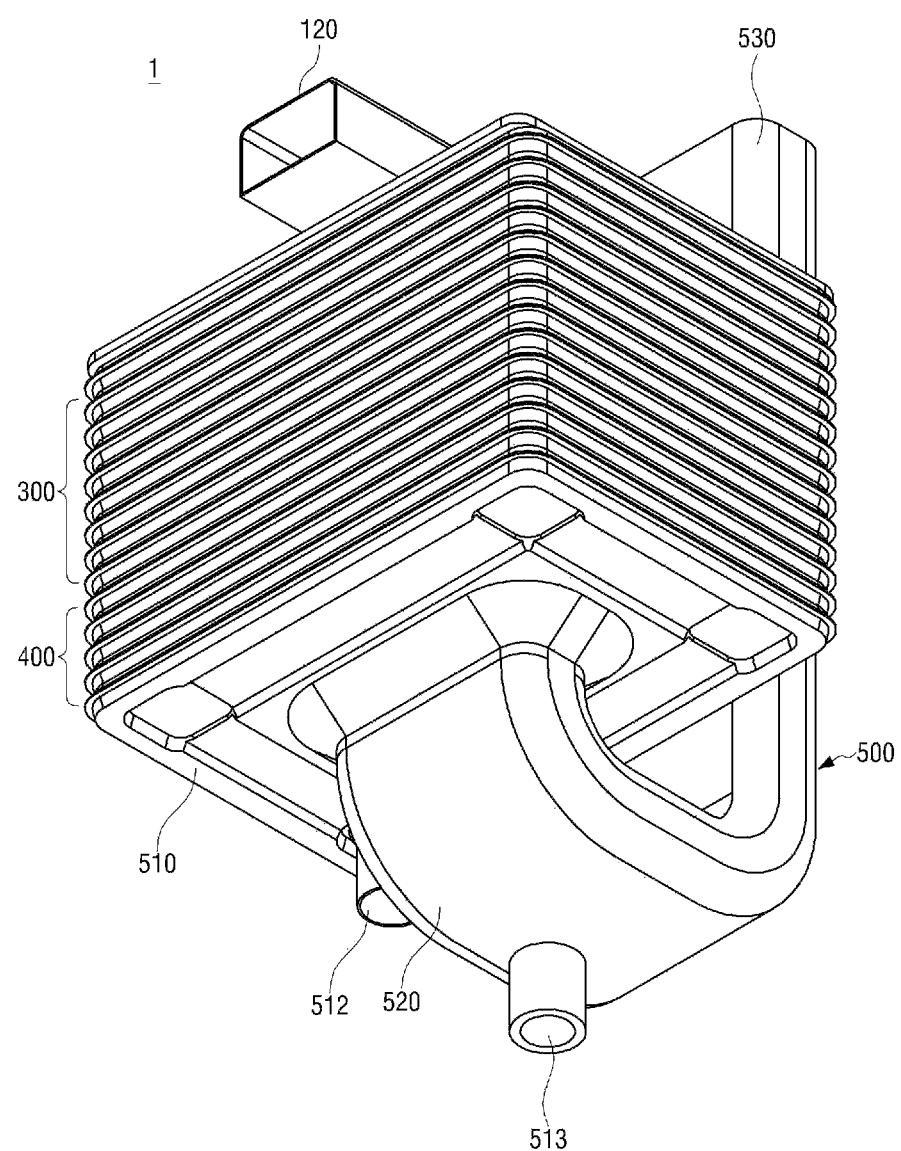
Figure 4:
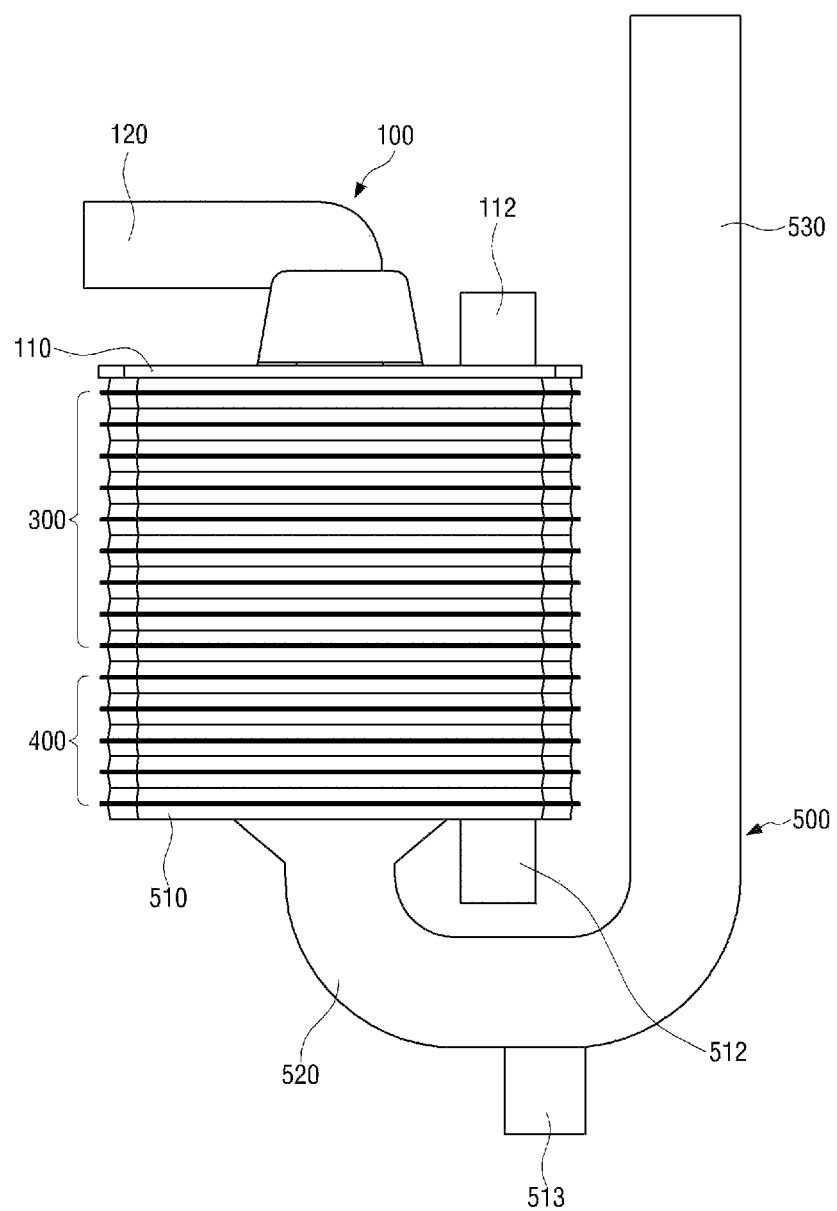
FIG. 4 is a right lateral view of the heat exchanger according to one embodiment of the present disclosure.

Hereinafter, a configuration and an action with respect to an embodiment of the present disclosure will be described in detail as follows with reference to the accompanying drawings.

With reference to FIGS. 2 to 5, a heat exchanger 1 according to the present disclosure is configured to include a mixture inflow unit 100 in which a mixture of air and fuel flows; a burner 200 for burning the mixture flowing in through the mixture inflow unit 100; heat exchange units 300 and 400 provided at a circumference of the burner 200 to exchange heat between combustion gas generated by combustion of the burner 200 and a heating medium and configured with a plurality of unit plates 310, 320, 330, 340, 350, 360, 370, 380, 410, 420, 430, and 440 which are longitudinally stacked; and a combustion gas discharge unit 500 through which the combustion gas passed the heat exchangers 300 and 400 is discharged.

The mixture inflow unit 100 is configured to include an upper cover plate 110 at which a through hole 111 is formed at one side of the upper cover plate 110, wherein a heating medium discharge pipe 112 passes through the through hole 111, and a mixture inflow pipe 120 passing through a center of the upper cover plate 110 to allow the mixture to flow in the mixture inflow pipe 120.

The burner 200 burns the mixture of the air and the fuel flowing therein through the mixture inflow unit 100, to thereby generate combustion gas of high temperature. The burner 200 is configured to be fixed to a burner support plate 210 to generate flame in a downward direction. The burner support plate 210 is configured with a plane portion A in which a through hole B is formed at a central part thereof, wherein the burner 200 passes through the through hole B; a flange portion C extending from an edge of the plane portion A to a downward side thereof to be bent to an outward side thereof; and a depressed portion D having a downwardly concave shape at a region between the edge of the plane portion A and the through hole B.

The heat exchange units 300 and 400 may be configured with a sensible-heat exchange unit 300 for absorbing sensible heat of combustion gas generated by combustion of the burner 200, and a latent-heat exchange unit 400 for absorbing latent heat generated while water vapor contained in combustion gas, which is undergone heat exchange at the sensible heat exchangers 300, is condensed.

The combustion gas discharge unit 500 is configured with a lower cover plate 510 covering a lower part of the latent-heat exchange unit 400, an exhaust gas discharge pipe 520 communicating with a lower side of a through hole B formed at a center of the lower cover plate 510 and connected to a condensed water discharge pipe 513 at a lower end of the exhaust gas discharge pipe 520, and a flue 530 connected to one side of the exhaust gas discharge pipe 520 to extend to an upward side.

The lower cover plate 510 includes a plane portion A at which the through hole B is formed at a central part thereof, a flange portion C extending from an edge of the plane portion A to an upward side thereof to be bent to an outward side thereof, a passage forming protruding portion D1 having an upwardly convex shape at a region between the edge of the plane portion A and the through hole B, and a plurality of gap maintaining protruding portions E1 protruding at the same height as that of the flange portion C on corners of the passage forming protruding portion D1, and a through hole 511 through which a heating medium inflow pipe 512 passes is formed at the gap maintaining protruding portions E1, which is located at one side of the lower cover plate 510.

Hereinafter, a configuration and an action of each of the sensible-heat exchange unit 300 and the latent-heat exchange unit 400 configuring the heat exchange units 300 and 400 which are a characteristic configuration of the present disclosure will be described.

The present disclosure is characterized in that a heating medium passage P1, a combustion gas passage P2, and a combustion gas discharge passage P3 are integrally formed inside the plurality of unit plates 310, 320, 330, 340, 350, 360, 370, 380, 410, 420, 430, and 440 which configure the heat exchange units 300 and 400 and are longitudinally stacked.

With reference to FIGS. 5, 8, 9, 13, and 14, the sensible-heat exchange unit 300 is configured with the plurality of unit plates 310, 320, 330, 340, 350, 360, 370, and 380 which are longitudinally stacked, and the latent-heat exchange unit 400 is configured with the plurality of unit plates 410, 420, 430, and 440 which are longitudinally stacked. And, a heat isolator 390 is provided between the sensible-heat exchange unit 300 and the latent-heat exchange unit 400 so as to spatially separate the sensible-heat exchange unit 300 from the latent-heat exchange unit 400 and to prevent sensible heat generated at the sensible-heat exchange unit 300 from being directly transferred to the latent-heat exchange unit 400.

The unit plates 310, 320, 330, 340, 350, 360, 370, and 380, which configure the sensible-heat exchange unit 300, are configured with first plates 310a, 320a, 330a, 340a, 350a, 360a, 370a, and 380a located at upper parts of the unit plates 310, 320, 330, 340, 350, 360, 370, and 380, and second plates 310*b*, 320*b*, 330*b*, 340*b*, 350*b*, 360*b*, 370*b*, and 380*b* coupled to lower parts of the first plates 310*a*, 320*a*, 330*a*, 340*a*, 350*a*, 360*a*, 370*a*, and 380*a*.

The unit plates 410, 420, 430, and 440, which configure the latent-heat exchange unit 400, are configured with first plates 410*a*, 420*a*, 430*a*, and 440*a* located at upper parts of the unit plates 410, 420, 430, and 440, and second plates 410*b*, 420*b*, 430*b*, and 440*b* coupled to lower parts of the first plates 410*a*, 420*a*, 430*a*, and 440*a* so that they have a stacked structure of a similar shape to that of the sensible-heat exchange unit 300.

Hereinafter, the first plates 310*a*, 320*a*, 330*a*, 340*a*, 350*a*, 360*a*, 370*a*, and 380*a* configuring the sensible-heat exchange unit 300, and the first plates 410*a*, 420*a*, 430*a*, and 440*a* configuring the latent-heat exchange unit 400 are configured in a similar shape pattern so that they will be referred to as a 'first plate,' and also the second plates 310*b*, 320*b*, 330*b*, 340*b*, 350*b*, 360*b*, 370*b*, and 380*b* configuring the sensible-heat exchange unit 300, and the second plates 410*b*, 420*b*, 430*b*, and 440*b* configuring the latent-heat exchange unit 400 are configured in a similar shape pattern so that they will be referred to as a 'second plate,' and then a configuration of each of them will be described.

The first plate includes a first plane portion A1 in which a first through hole B1 is formed at a central part thereof, a first flange portion C1 extending from an edge of the first plane portion A1 to an upper side thereof to be bent to an outward side thereof, a passage forming protruding portion D1 formed to be convex upward at a region between the edge of the first plane portion A1 and the first through hole B1, and a combustion gas outlet F1 longitudinally passing through the edge of the first plane portion A1 to provide a combustion gas discharge passage P3.

The second plate includes a second plane portion A2 in which a second through hole B2 of a shape corresponding to that of the first through hole B1 is formed at a center of the second plane portion A2, and having an upper surface coming into tight contact with a bottom surface of the plane portion A1; a second flange portion C2 extending from an edge of the second plane portion A2 to a lower side thereof to be bent to an outward side thereof and coupled to a first flange portion C1 of a unit plate being located below the second flange portion C2; a passage forming depressed portion D2 formed to be concave downward at a region between the edge of the second plane portion A2 and the second through hole B2, thereby forming the heating medium passage P1 between the passage forming protruding portion D1 and the passage forming depressed portion D2; and a combustion gas outlet F2 longitudinally passing through the edge of the second plane portion A2 to provide the combustion gas discharge passage P3.

The first flange portion C1 is formed to be higher than a protruding height of the passage forming protruding portion D1, and the second flange portion C2 is formed to be deeper than a depressed depth of the passage forming depressed portion D2. Consequently, among unit plates being longitudinally stacked to be adjacent to each other, a longitudinally separated space is provided between a lower end of a passage forming depressed portion D2 of a unit plate located at an upper side thereamong and an upper end of a passage forming protruding portion D1 of a unit plate located at a lower side thereamong, thereby forming the combustion gas passage P2.

And, a plurality of gap maintaining protruding portions E1, each of which protrudes at the same height as that of the first flange portion C1, are formed to be spaced apart from each other in a circumferential direction at the passage forming protruding portion D1, and a plurality of gap maintaining depressed portions E2, each of which is depressed at the same depth as that of the second flange portion C2, are formed at the passage forming depressed portion D2. Therefore, among the unit plates being longitudinally stacked to be adjacent to each other, a second flange portion C2 formed at a unit plate located at an upper side thereamong is coupled to a first flange portion C1 formed at a unit plate located at a lower side thereamong, and a lower end of a gap maintaining depressed portion E2 formed at the unit plate located at the upper side and an upper end of a gap maintaining protruding portion E1 formed at the unit plate located at the lower side come into contact with and are supported by each other.

As described above, because the second flange portion C2 at the upper side and the first flange portion C1 at the lower side are coupled to each other, the gap maintaining depressed portion E2 at the upper side and the gap maintaining protruding portion E1 at the lower side come into contact with each other to be supported, and the combustion gas outlets F1 and F2 being longitudinally communicated are formed at the edge of each of the first plate and the second plate, the heating medium passage P1, the combustion gas passage P2, and the combustion gas discharge passage P3 are integrally formed inside the unit plates being longitudinally stacked to be adjacent to each other when the unit plates are stacked, and also bond strength between the unit plates may be improved.

Also, one of the passage forming protruding portion D1 and the passage forming depressed portion D2, or both of them may be configured to include a turbulent flow forming portion G of an irregular shape. The turbulent flow forming portion G may be configured in an outward protruding shape or an inward depressed shape on a surface of the passage forming protruding portion D1 and the passage forming depressed portion D2, and such a shape may be configured in a variety of shapes including an embossed shape, an oval shape, a rib shape inclined to one side, or the like.

According to the configuration of the turbulent flow forming portion G, heat exchange efficiency may be improved by promoting generation of a turbulent flow in a flow of a heating medium passing the heating medium passage P1 and a flow of combustion gas passing the combustion gas passage P2.

Further, when the turbulent flow forming portion G is formed at the passage forming protruding portion D1 of the first plate in an downward depressed shape and at the passage forming depressed portion D2 of the second plate in an upward protruding shape, to thereby contact a lower end of the downward depressed segment of the turbulent flow forming portion G to an upper end of the upward protruding segment thereof, bond strength between the passage forming protruding portion D1 and the passage forming depressed portion D2 may be increased, thereby preventing the passage forming protruding portion D1 and the passage forming depressed portion D2 from being deformed and damaged due to pressure of the heating medium passing the heating medium passage P1.

In a helical heat exchange pipe structure according to the related art, deformation and damage problems of a pipe are caused by a bending process of the pipe so that there is a limitation to a structure in which it may be very difficult to secure a sufficient area on a surface of a heat exchange pipe so as to form an irregular shape promoting a turbulent flow thereon. On the other hand, according to the present disclosure, a heat exchanger is configured by stacking unit plates so that there is an advantage in which a space for forming the turbulent flow forming portion G may be secured to be large.

Hereinafter, flow channels of combustion gas and a heating medium in the heat exchanger according to the present disclosure will be described.

Firstly, a flow channel of combustion gas will be described.

With reference to FIGS. 6 and 8 to 11, a longitudinal flow of combustion gas generated by combustion of the burner 200 is blocked by the upper cover plate 110 and the heat isolator 390, and thus the combustion gas flows in a radially outward direction centering on the burner 200 to pass the combustion gas passage P2 formed at each of the unit plates 310, 320, 330, 340, 350, 360, 370, and 380 configuring the sensible-heat exchange unit 300. While passing the combustion gas passage P2, the combustion gas transfers heat to a heating medium passing the heating medium passage P1 of the sensible-heat exchange unit 300.

In the course of passing the combustion gas passage P2, generation of a turbulent flow is concurrently promoted in the flow of the combustion gas and the heating medium by the turbulent flow forming portion G formed at the passage forming protruding portion D1 and the passage forming depressed portion D2 so that heat transfer efficiency between the combustion gas and the heating medium may be increased.

The combustion gas, which passed the combustion gas passage P2, sequentially passes the combustion gas discharge passages P3 to move downward, wherein the combustion gas discharge passages P3 are longitudinally communicated by the combustion gas outlets F1 and F2 formed at each of the unit plates 310, 320, 330, 340, 350, 360, 370, 380, 410, 420, 430, and 440 being longitudinally stacked. At this point, while the combustion gas is passing the combustion gas discharge passage P3, heat transferred to an outer wall of the combustion gas discharge passage P3 is retransferred to the heating medium passing the heating medium passage P1 via the plane portions A1 and A2, the passage forming protruding portion D1, and the passage forming depressed portion D2 by a conducting method, and thus a heat loss may be minimized to more improve thermal efficiency.

Thereafter, a downward flow of the combustion gas entering the combustion gas discharge passage P3 of the latent-heat exchange unit 400 is blocked by the lower cover plate 510 and the combustion gas passes the combustion gas passage P2, which is formed at each of the unit plates 410, 420, 430, and 440 configuring the latent-heat exchange unit 400, to flow inside the latent-heat exchange unit 400. In the course of the above described process, latent heat of condensed water contained in water vapor of the combustion gas is transferred to the heating medium passing the heating medium passage P1 of the latent-heat exchange unit 400, thereby preheating the heating medium. Also, while the combustion gas is passing the combustion gas passage P2 of the latent-heat exchange unit 400, generation of a turbulent flow is promoted in the flow of the combustion gas and the heating medium by the turbulent flow forming portion G formed at the passage forming protruding portion D1 and the passage forming depressed portion D2 so that a collection rate of the latent heat may be increased.

The combustion gas, which passed the combustion gas passage P2 of the latent-heat exchange unit 400, is discharged upward through the exhaust gas discharge pipe 520 and the flue 530, and the condensed water is discharged downward through the condensed water discharge pipe 513 connected to the lower part of the exhaust gas discharge pipe 520.

Hereinafter, a flow channel of a heating medium will be described.

A flow channel of a heating medium is configured such that the heating medium flows in the latent-heat exchange unit 400 through the heating medium inflow pipe 512 connected to the lower part thereof, and absorbs latent heat and sensible heat by sequentially passing the latent-heat exchange unit 400 and the sensible-heat exchange unit 300, and are discharged through a heating medium discharge pipe 112 connected to an upper part of the sensible-heat exchange unit 300.

Firstly, with reference to FIGS. 5, 7, 12, 13, and 14, one embodiment of a flow channel of a heating medium will be described.

A flow channel of a heating medium according to one embodiment is configured such that the heating medium, which flows in through a through hole formed at one side of a second plate configuring a unit plate located at a lower side of unit plates being longitudinally located to be adjacent to each other, is branched off to both sides to flow along a heating medium passage P1 and then passes a through hole formed a first plate located at an opposite side against the second plate and a through hole formed at a second plate configuring a unit plate being located over the first plate, and flows in a heating medium passage P1 being located at the unit plate over the first plate.

In a configuration for the purpose of implementing the described above, the passage forming protruding portion D1 is formed to be communicated with an entire section at a region between the edge of the first plane portion A1 and the first through hole B1 along a circumferential direction, the passage forming depressed portion D2 is formed to be communicated with an entire section at a region between the edge of the second plane portion A2 and the second through hole B2 along the circumferential direction, and a through hole is formed at the gap maintaining protruding portion E1 and the gap maintaining depressed portion E2 so as to connect a heating medium passage P1 of a unit plate being located at the lower side to that of a unit plate being located at the upper side, wherein the through hole is located so as to reverse a direction of the heating medium passage P1 at the unit plate being located at the lower side against that of the heating medium passage P1 at the unit plate being located at the upper side.

Figure 5:
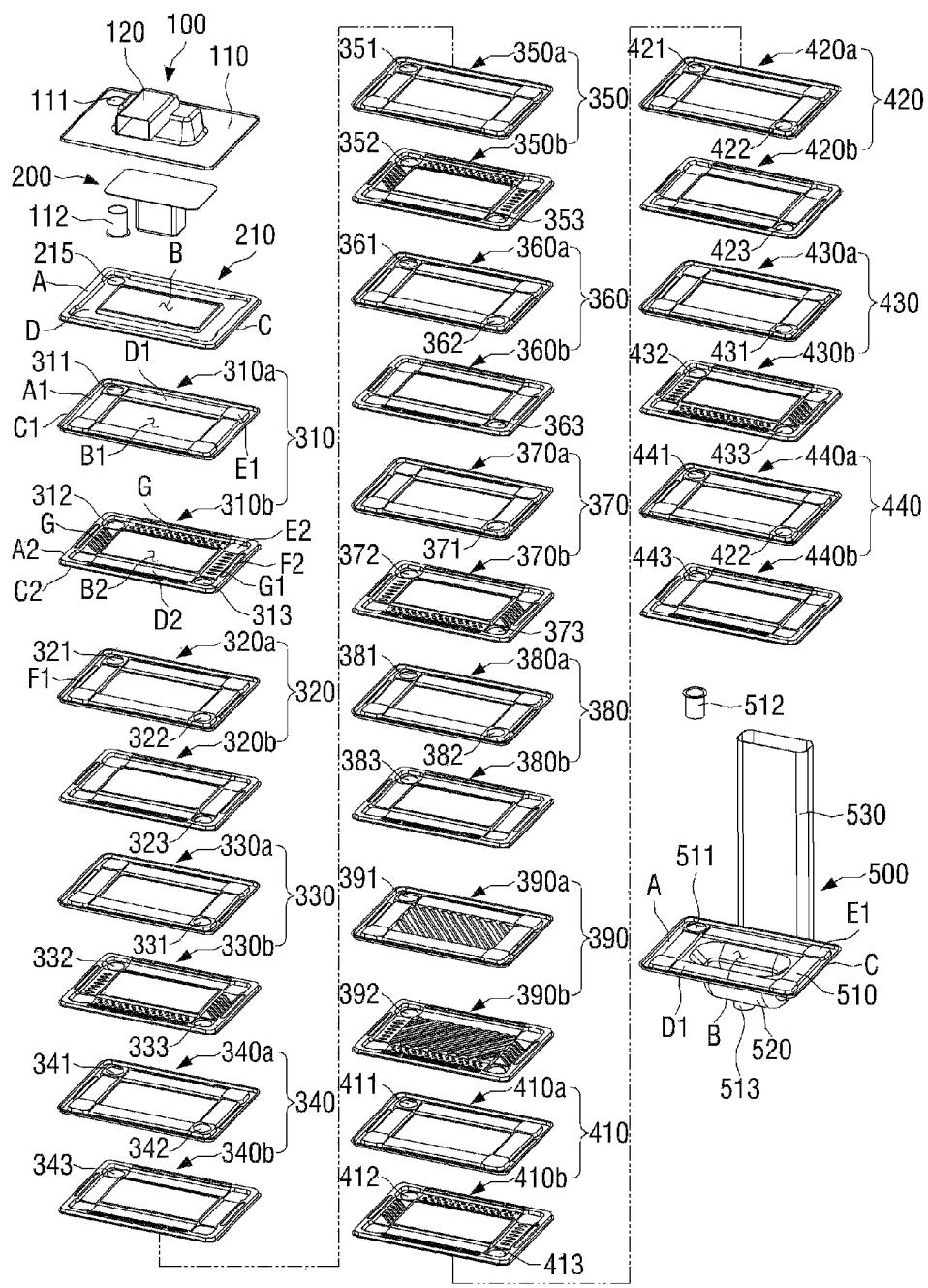
FIG. 5 is an exploded perspective view of the heat exchanger according to one embodiment of the present disclosure.
Figure 6:
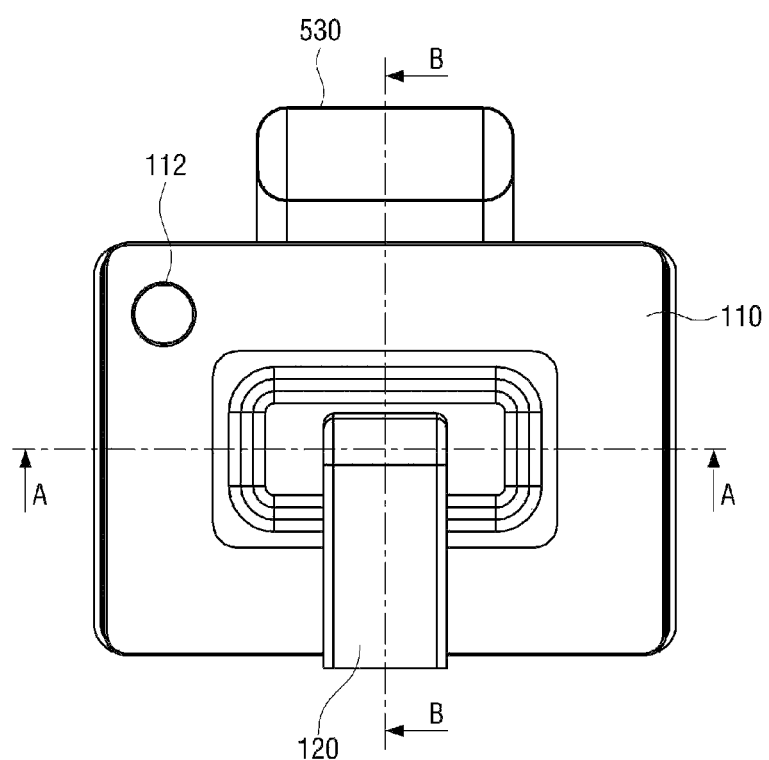
FIG. 6 is a plan view of the heat exchanger according to one embodiment of the present disclosure.
Figure 7:
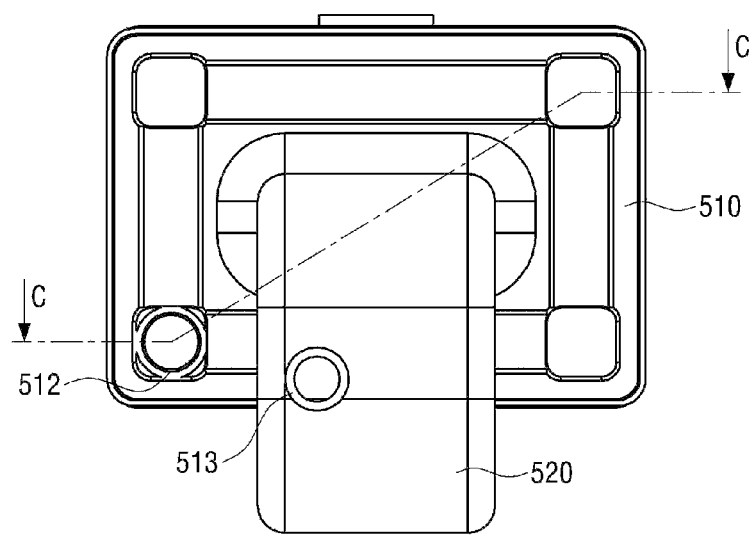
FIG. 7 is a bottom view of the heat exchanger according to one embodiment of the present disclosure.
Figure 8:
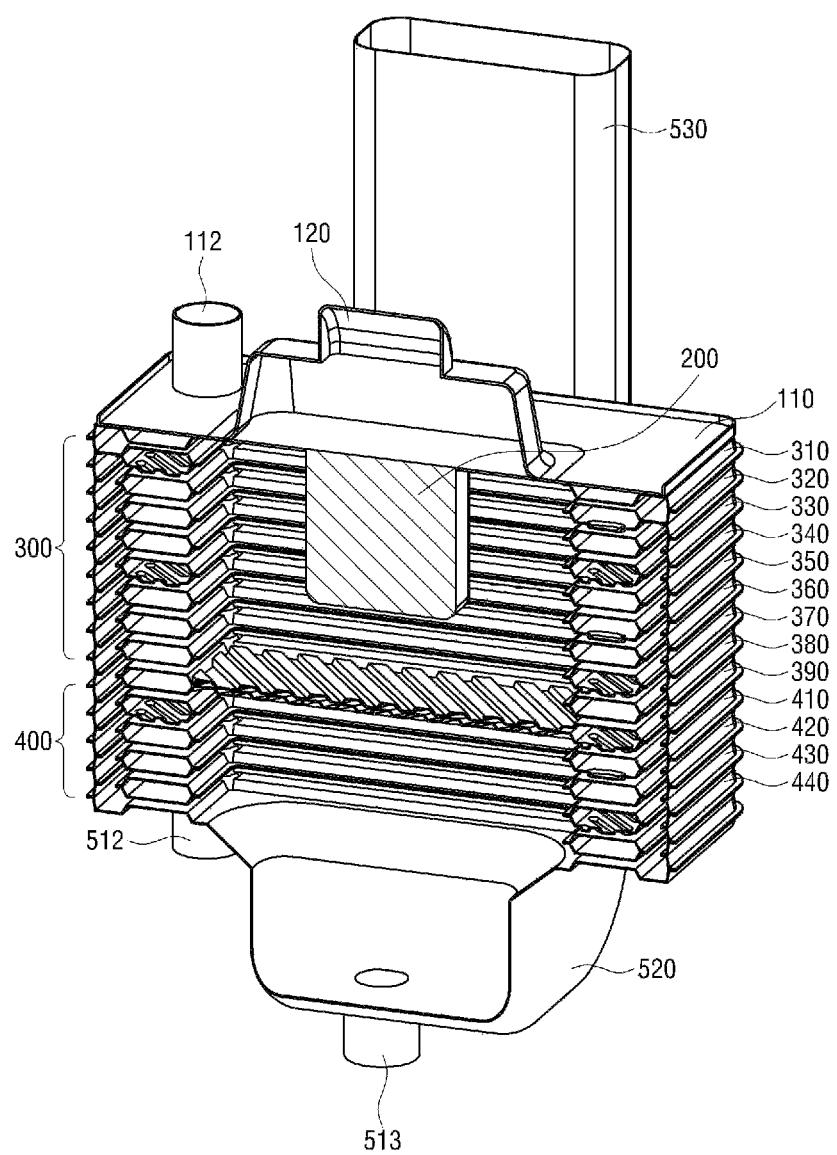
FIG. 8 is a perspective view taken along line A-A of FIG. 6.
Figure 9:
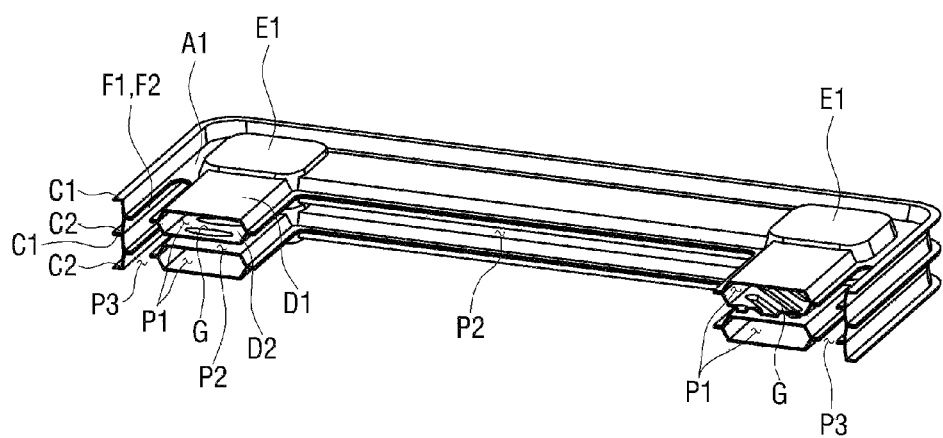
FIG. 9 is a perspective view enlarging a part of a unit plate shown in FIG. 8.
Figure 10:
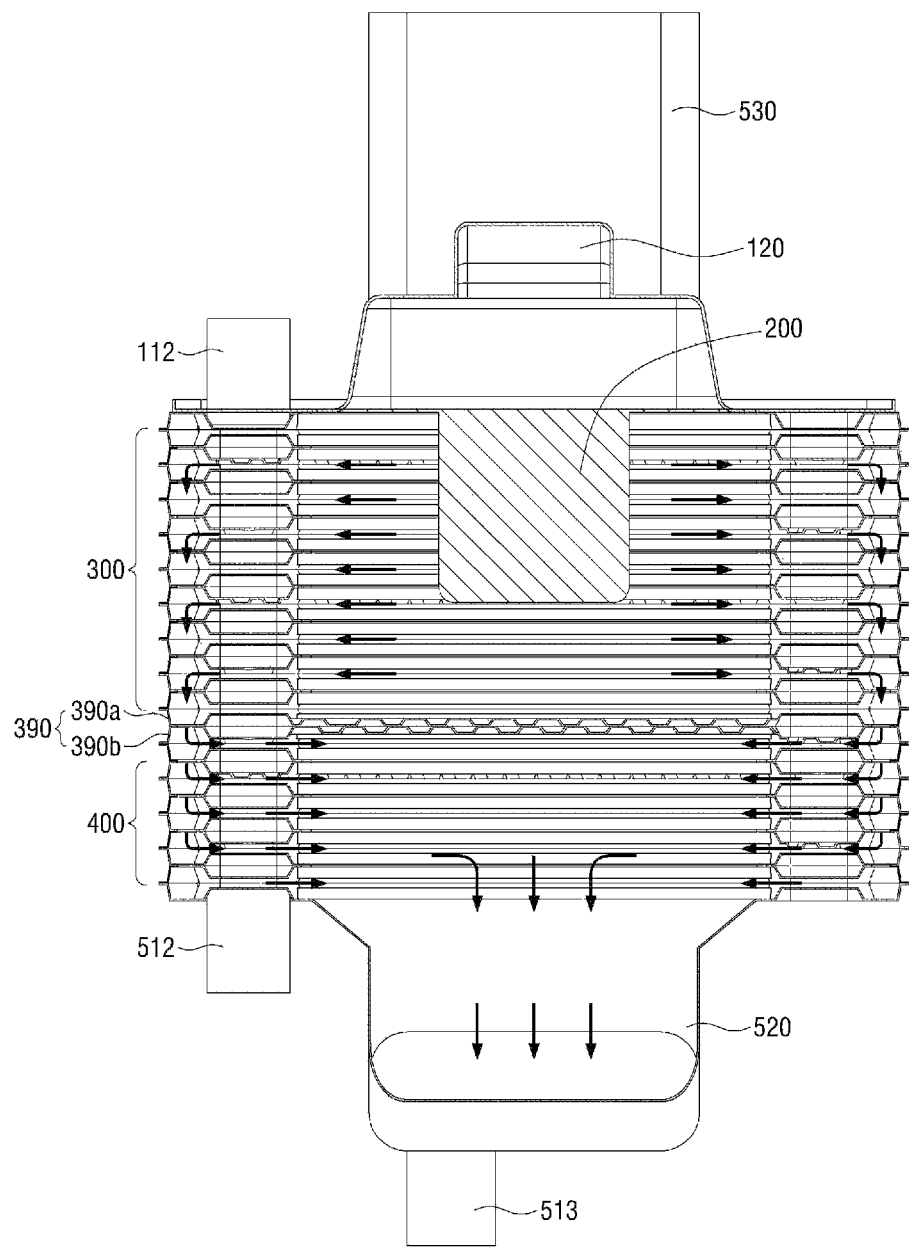
FIG. 10 is a cross-sectional view taken along line A-A of FIG. 6.
Figure 11:
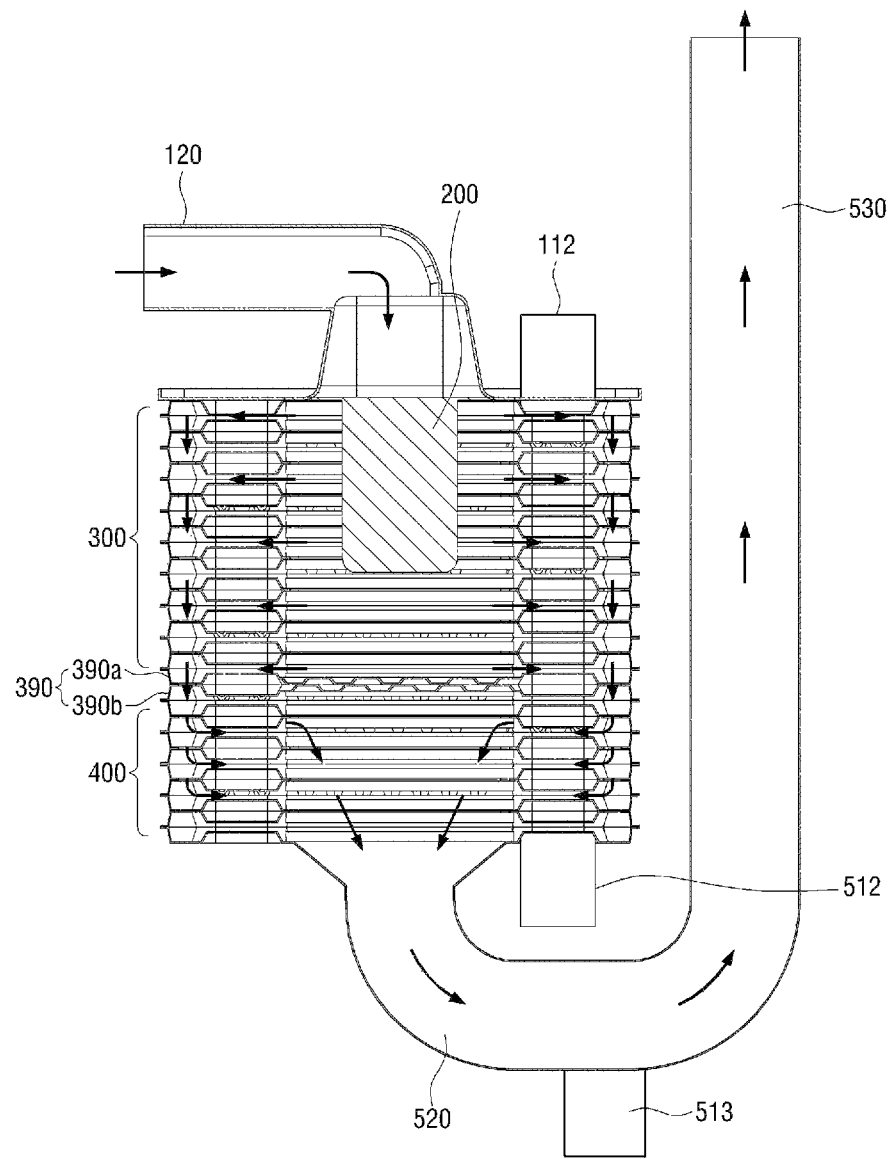
FIG. 11 is a cross-sectional view taken along line B-B of FIG. 6.
Figure 12:
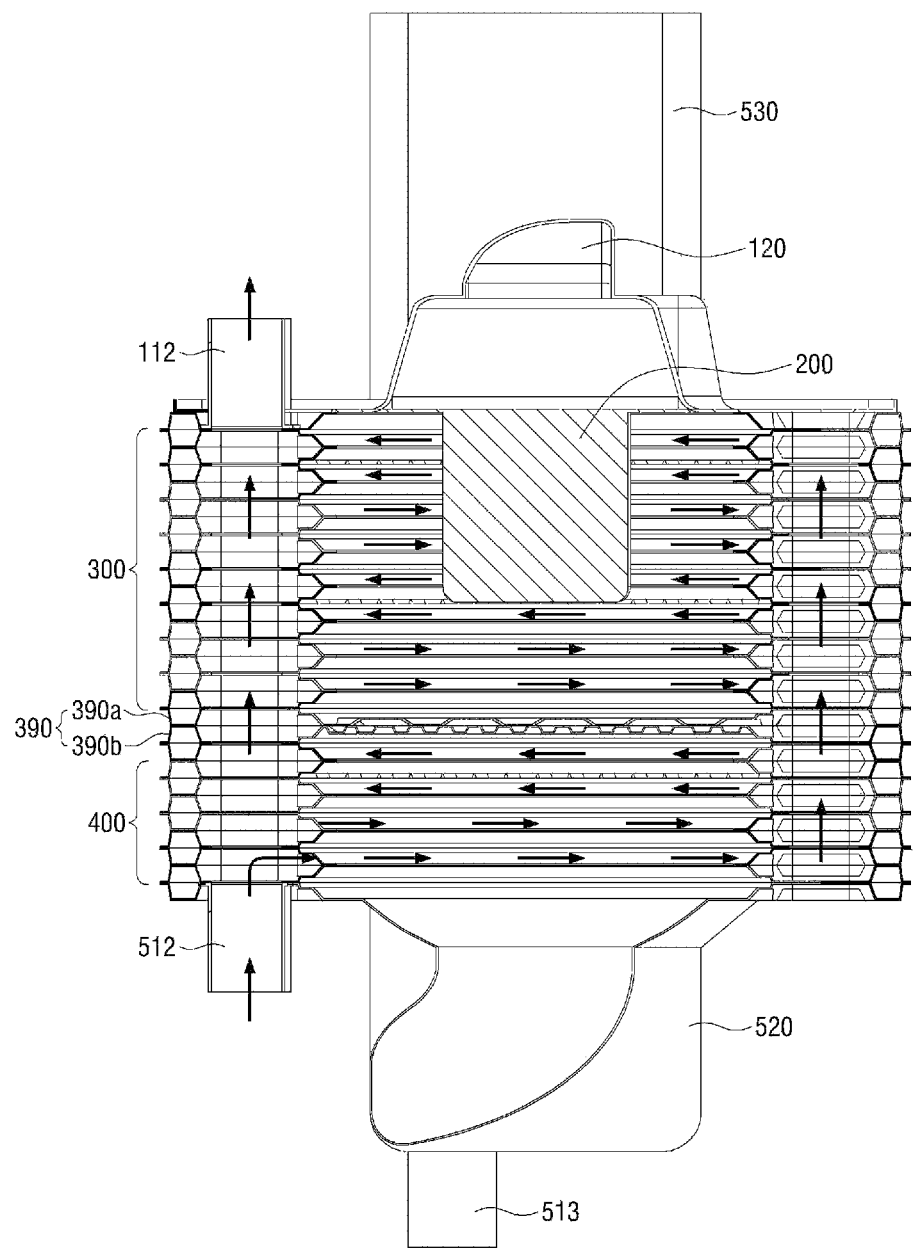
FIG. 12 is a cross-sectional view taken along line C-C of FIG. 7.
Figure 13:
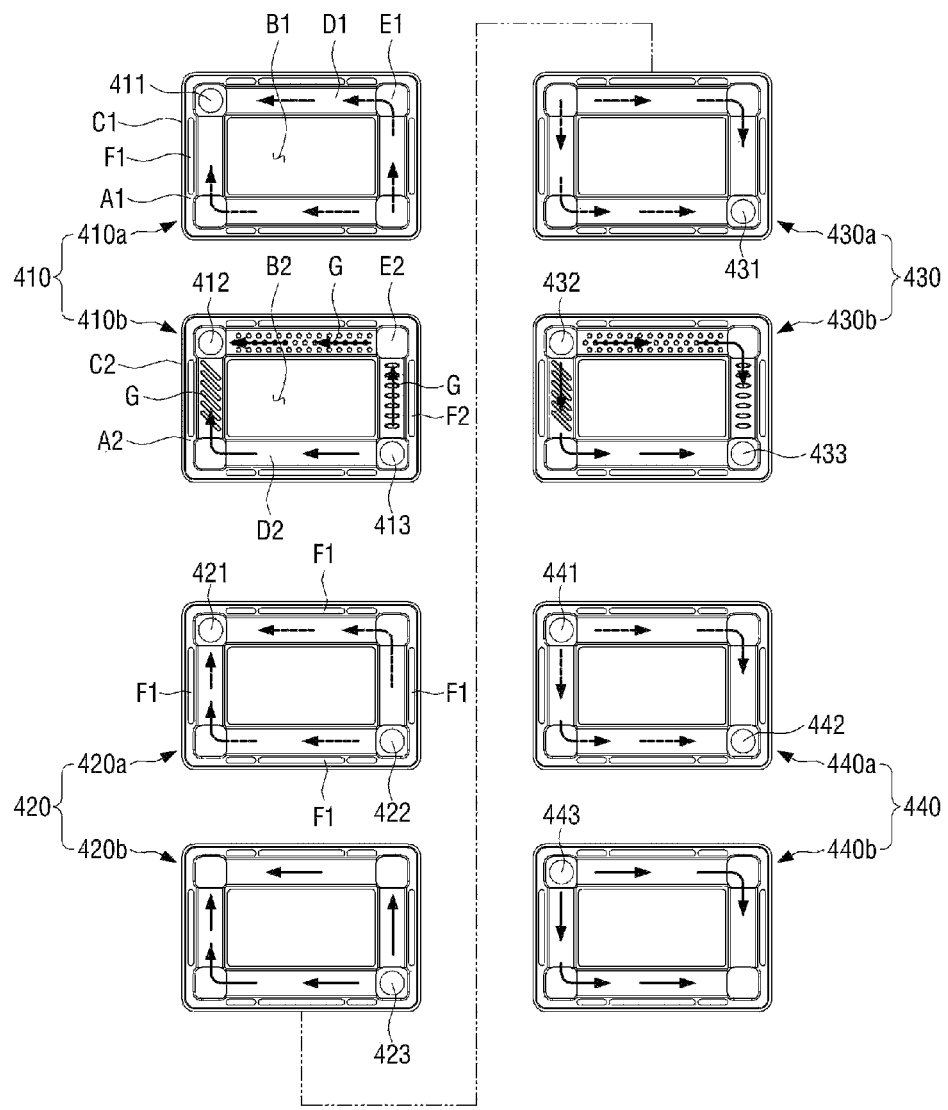
FIG. 13 is a diagram for describing a passage of a heating medium at a latent-heat exchange unit of the heat exchanger according to one embodiment of the present disclosure.
Figure 14:
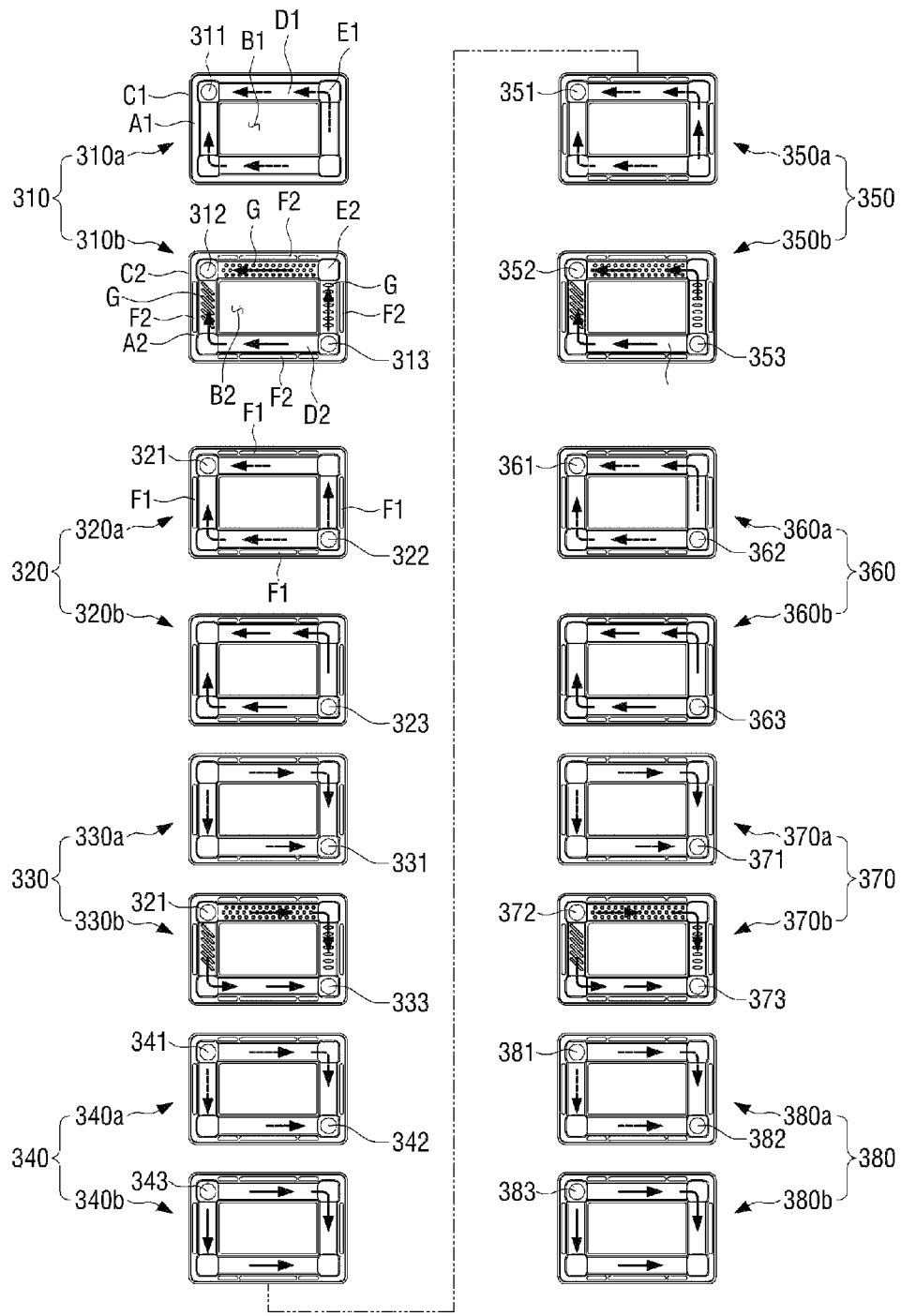
FIG. 14 is a diagram for describing a passage of a heating medium at a sensible-heat exchange unit of the heat exchanger according to one embodiment of the present disclosure.

Hereinafter, a flow channel of a heating medium in the heat exchange units 300 and 400 will be described in more detail with reference to FIGS. 5, 13, and 14.

Firstly, with reference to FIGS. 5 and 13, a flow channel of a heating medium in the latent-heat exchange unit 400 will be described. As arrows shown in FIG. 13, a heating medium, which flowed in through the heating medium inflow pipe 512, flows in a heating medium passage P1 inside the unit plate 440 through a through hole 443 formed at the second plate 440*b* of the unit plate 440 that is located at a lower-most position of the latent-heat exchange unit 400.

Some of the heating medium, which flows in the heating medium passage P1 inside the unit plate 440, flows in a heating medium passage P1 inside the unit plate 430 through a through hole 441 formed at the first plate 440*a* and a through hole 432 formed at the second plate 430*b* of the unit plate 430 being stacked over the first plate 440*a*, and the remaining of the heating medium is branched off to both sides centering on the through hole 443 to flow in a direction toward a through hole 442 formed at the first plate 440a being located at an opposite side against the second plate 440b and then flows in the heating medium passage P1 inside the unit plate 430 through a through hole 433 formed at the second plate 430b of the unit plate 430 being stacked over the first plate 440a.

The heating medium, which flowed in through the through hole 432 of the unit plate 430, is branched off to both sides to flow in a direction toward a through hole 431 formed at the first plate 430a being located at an opposite side against the second plate 430b, and then flows in a heating medium passage P1 of the unit plate 420 through a through hole 423 formed at the second plate 420b of the unit plate 420 being stacked over the first plate 430a.

Some of the heating medium, which flowed in the heating medium passage P1 of the unit plate 420, flows in a heating medium passage P1 inside the unit plate 410 through a through hole 422 formed at the first plate 420a and a through hole 413 formed at the second plate 410b of the unit plate 410 being stacked over the first plate 420a, and the remaining of the heating medium is branched off to both sides centering on the through hole 423 to flow in a direction toward a through hole 421 formed at the first plate 420a being located an opposite side against the second plate 420b, and then flows in the heating medium passage P1 inside the unit plate 410 through a through hole 412 formed at the second plate 410b of the unit plate 410 being stacked over the first plate 420a.

The heating medium, which flowed in the heating medium passage P1 inside the unit plate 410 through the through hole 413 formed at the second plate 410b, is branched off to both sides to flow toward a through hole 411 formed at the first plate 410a being located at an opposite side against the second plate 410b, and then passes a through hole 392 formed at a lower cover panel 390b and a through hole 391 formed at an upper cover panel 390a to flow to the sensible-heat exchange unit 300, wherein the lower cover panel 390b and the upper cover panel 390a configure the heat isolator 390. Meanwhile, the heating medium is filled between the upper cover panel 390a and the lower cover panel 390b, thereby preventing combustion heat of the sensible-heat exchange unit 300 from being transferred to the latent-heat exchange unit 400.

As described above, the passage of the heating medium is branched off to both sides at an upper left end of each of the unit plates 440 and 430 located at a lower stacked group of the latent-heat exchange unit 400 so that the heating medium flows in a direction toward a lower right end thereof, whereas the passage of the heating medium is branched off to both sides at a lower right end of each of the unit plates 420 and 410 being located at an upper stacked group of the latent-heat exchange unit 400 so that the heating medium flows in a direction toward an upper left end thereof, and thus a direction of the passage of the heating medium may be changed to form the passage of the heating medium to be long.

Next, a flow channel of a heating medium in the sensible-heat exchange unit 300 will be described with reference to FIGS. 5 and 14. As arrows shown in FIG. 14, a heating medium, which passed the through hole 391 formed at the upper cover panel 390a of the heat isolator 390, flows in a heating medium passage P1 inside the unit plate 380 through a through hole 383 formed at the second plate 380b of the unit plate 380 that is located at a lower-most position of the sensible-heat exchange unit 300.

Some of the heating medium, which flowed in the heating medium passage P1 inside the unit plate 380, flows in a heating medium passage P1 inside the unit plate 370 through a though hole 381 formed at the first plate 380a and a through hole 372 formed at the second plate 370b of the unit plate 370 being stacked over the first plate 380a, and the remaining of the heating medium is branched off to both sides centering on the through hole 383 to flow in a direction toward a through hole 382 formed at the first plate 380a being located at an opposite side against the second plate 380b and then flows in the heating medium passage P1 inside the unit plate 370 through a through hole 373 formed at the second plate 370b of the unit plate 370 being stacked over the first plate 380a.

The heating medium, which flowed in through the through hole 372 of the unit plate 370, is branched off to both sides to flow in a direction toward a through hole 371 formed at the first plate 370a being located at an opposite side against the second plate 370b, and then flows in a heating medium passage P1 of the unit plate 360 through a through hole 363 formed at the second plate 360b of the unit plate 360 being stacked over the first plate 370a.

Some of the heating medium, which flowed in the heating medium passage P1 of the unit plate 360, flows in a heating medium passage P1 inside the unit plate 350 through a through hole 362 formed at the first plate 360a and a through hole 353 formed at the second plate 350b of the unit plate 350 being stacked over the first plate 360a, and the remaining of the heating medium is branched off to both sides centering on the through hole 363 to flow in a direction toward a through hole 361 formed at the first plate 360a being located at an opposite side against the second plate 360b, and then flows in the heating medium passage P1 inside the unit plate 350 through a through hole 352 formed at the second plate 350b of the unit plate 350 being stacked over the first plate 360a.

The heating medium, which flowed in through the through hole 353 of the unit plate 350, is branched off to both sides to flow in a direction toward a through hole 351 formed at the first plate 350a being located at an opposite side against the second plate 350b, and then flows in a heating medium passage P1 of the unit plate 340 through a through hole 343 formed at the second plate 340b of the unit plate 340 being stacked over the first plate 350a.

Some of the heating medium, which flowed in the heating medium passage P1 of the unit plate 340, flows in a heating medium passage P1 inside the unit plate 330 through a through hole 341 formed at the first plate 340a and a through hole 332 formed at the second plate 330b of the unit plate 330 being stacked over the first plate 340a, and the remaining of the heating medium is branched off to both sides centering on the through hole 343 to flow in a direction toward a through hole 342 formed at the first plate 340a being located at an opposite side against the second plate 340b, and then flows in the heating medium passage P1 inside the unit plate 330 through a through hole 333 formed at the second plate 330b of the unit plate 330 being stacked over the first plate 340a.

The heating medium, which flowed in through the through hole 332 of the unit plate 330, is branched off to both sides to flow in a direction toward a through hole 331 formed at the first plate 330a being located at an opposite side against the second plate 330b, and then flows in a heating medium passage P1 inside the unit plate 320 through a through hole 323 formed at the second plate 320b of the unit plate 320 being stacked over the first plate 330a.

Some of the heating medium, which flowed in the heating medium passage P1 inside the unit plate 320, flows in a heating medium passage P1 inside the unit plate 310 through a through hole 322 formed at the first plate 320a and a through hole 313 formed at the second plate 310b of the unit plate 310 being stacked over the first plate 320a, and the remaining of the heating medium is branched off to both sides centering on the through hole 323 to flow in a direction toward a through hole 321 formed at the first plate 320a being located at an opposite side against the second plate 320b, and then flows in the heating medium passage P1 inside the unit plate 310 through a through hole 312 formed at the second plate 310b of the unit plate 310 being stacked over the first plate 320a.

The heating medium, which flowed in the heating medium passage P1 inside the unit plate 310, is branched off to both sides centering on the through hole 313 to flow toward a through hole 311 formed at the first plate 310a being located at an opposite side against the second plate 310b, and then is discharged through the heating medium discharge pipe 112.

As described above, the passage of the heating medium is branched off to both sides at the upper left end of each of the unit plates 380 and 370 located at lower-most positions in the sensible-heat exchange unit 300 so that the heating medium flows in a direction toward the lower right end of each of the unit plates 380 and 370. And, the passage of the heating medium is branched off to both sides at the lower right end of each of the unit plates 360 and 350 located over the unit plates 380 and 370 so that the heating medium flows in a direction toward the upper left end of each of the unit plates 360 and 350. In addition, the passage of the heating medium is branched off to both sides at the upper left end of each of the unit plates 340 and 330 being located over the unit plates 360 and 350 so that the heating medium flows in a direction toward the lower right end of each of the unit plates 340 and 330. Further, the passage of the heating medium is branched off to both sides at the lower right end of each of the unit plates 320 and 310 being located over the unit plates 340 and 330 so that the heating medium flows in a direction toward the upper left end of each of the unit plates 320 and 310. As a result, the direction of the passage may be alternately changed to form a passage of the heating medium to be long.

Figure 15:
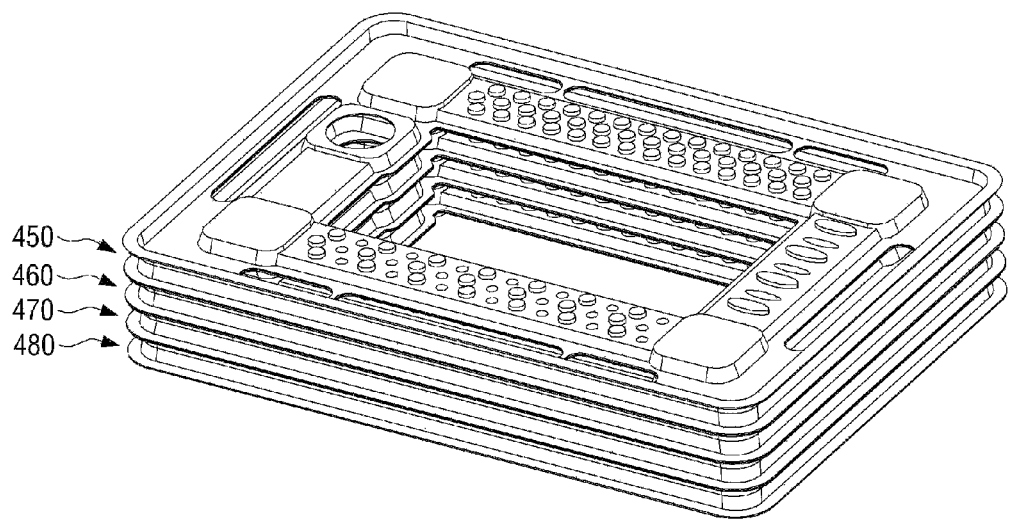
FIG. 15 is a perspective view of a stacked structure of unit plates according to another embodiment of the present disclosure.

Hereinafter, another embodiment of a flow channel of a heating medium will be described with reference to FIGS. 15 to 17. Unit plates 450, 460, 470, and 480 according to the present embodiment may replace the above described unit plates configuring the sensible-heat exchange unit 300 and the latent-heat exchange unit 400, and therefore, a structure of each of the unit plates 450, 460, 470, and 480 configuring a single set and a flow channel of a heating medium inside the structure thereof may be described below.

A flow channel of a heating medium according to the present embodiment is configured such that the heating medium, which flowed in through a through hole formed at one side of a second plate configuring one unit plate being located at a lower side among unit plates being longitudinally located to be adjacent to each other, flows in one direction along a heating medium passage P1 and then passes a through hole formed at a first plate being located at an opposite side against the second plate and a through hole formed at a second plate configuring another unit plate being located at an upper side thereamong to flow in a heating medium passage P1 of the other unit plate being located at the upper side.

In a configuration for the purpose of implementing the described above, the passage forming protruding portion D1 is formed to be communicated with some section at a region between the edge of the first plane portion A1 and the first through hole B1 along a circumferential direction, the passage forming depressed portion D2 is formed to be communicated with some section at a region between the edge of the second plane portion A2 and the second through hole B2 along the circumferential direction, and a through hole is formed at the gap maintaining protruding portion E1 and the gap maintaining depressed portion E2 so as to connect a heating medium passage P1 of a unit plate being located at the lower side to a heating medium passage P1 of a unit plate being located at the upper side, wherein the through hole is located so as to reverse a direction of the heating medium passage P1 at the unit plate being located at the lower side against that of the heating medium passage P1 at the unit plate being located at the upper side.

Figure 16:
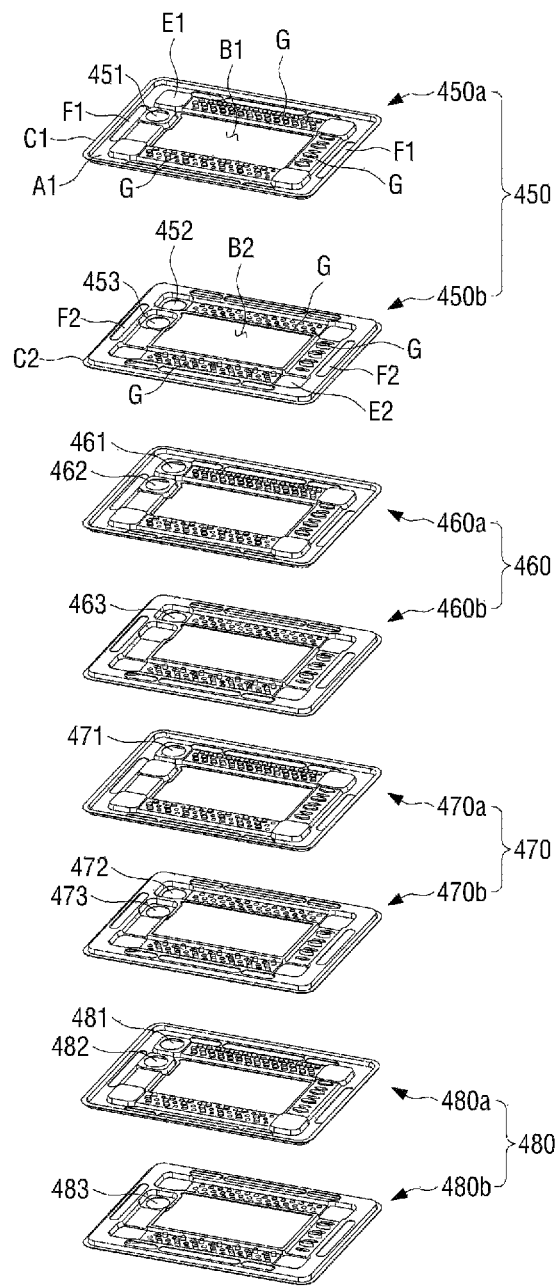
FIG. 16 is an exploded perspective view of FIG. 15.
Figure 17:
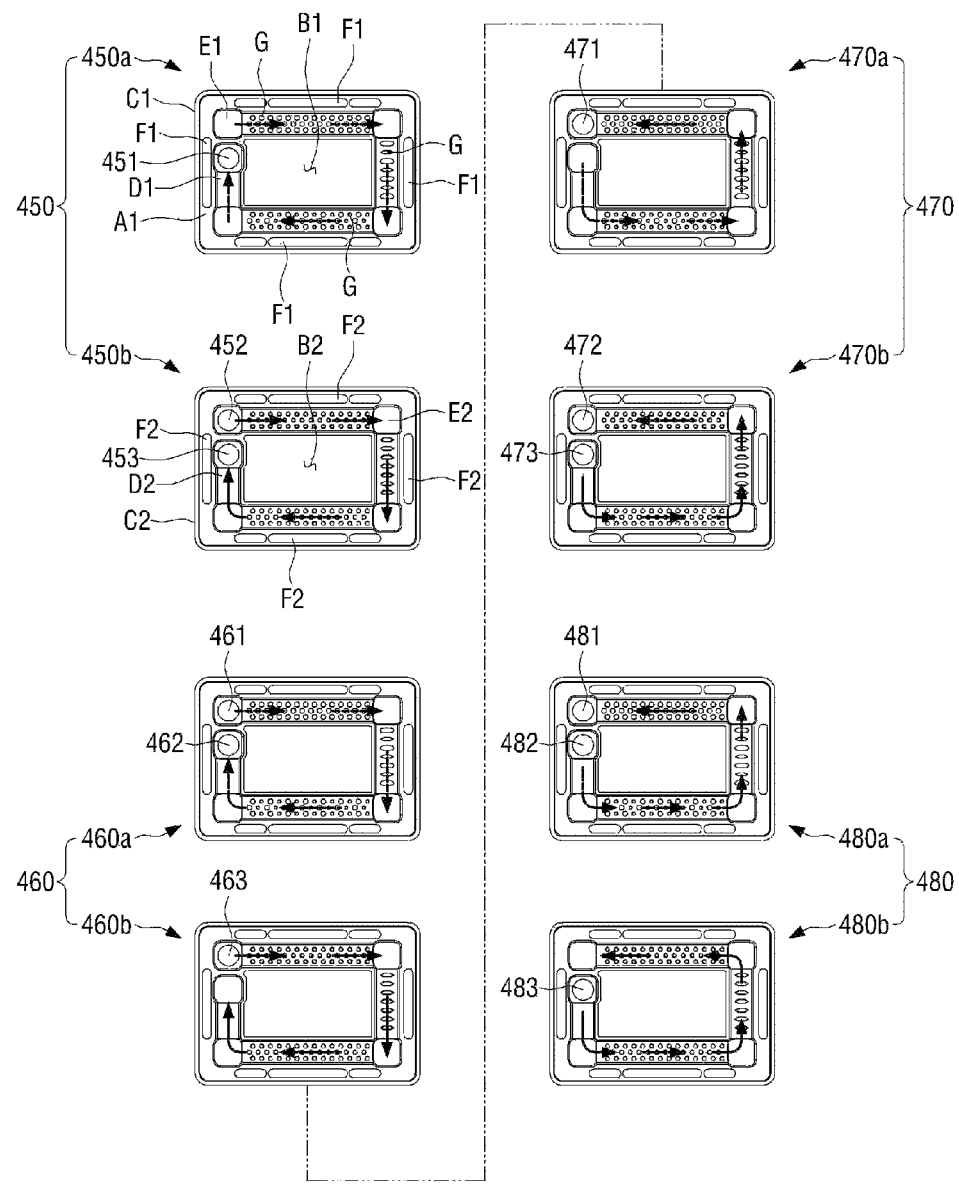
FIG. 17 is a diagram for describing a passage of a heating medium at the unit plate shown in FIG. 15.

With reference to FIGS. 16 and 17, some of a heating medium, which flowed in a heating medium passage P1 of the unit plate 480 through a through hole 483 formed at a second plate 480b of the unit plate 480 being located at a lower-most position, flows in a heating medium passage P1 inside the unit plate 470 through a through hole 482 formed at a first plate 480a and a through hole 473 formed at a second plate 470b of the unit plate 470 being stacked over the first plate 480a, and the remaining of the heating medium flows in one direction (a counterclockwise direction when viewed from the top plane) centering on the through hole 483 along the heating medium passage P1, and then flows in the heating medium passage P1 inside the unit plate 470 through a through hole 481 formed at the first plate 480a being located at an opposite side against the second plate 480b and a through hole 472 formed at the second plate 470b of the unit plate 470 being stacked over the first plate 480a.

The heating medium, which flowed in the heating medium passage P1 inside the unit plate 470, flows in one direction (a counterclockwise direction when viewed from the top plane) centering on the through hole 473 along the heating medium passage P1, and then flows in a heating medium passage P1 inside the unit plate 460 through a through hole 471 formed at a first plate 470a being located at an opposite side against the second plate 470b and a through hole 463 formed at a second plate 460b of the unit plate 460 being stacked over the first plate 470a.

Some of the heating medium, which flowed in the heating medium passage P1 inside the unit plate 460 through the through hole 463, flows in a heating medium passage P1 inside the unit plate 450 through a through hole 461 formed at a first plate 460a and a through hole 452 formed at a second plate 450b of the unit plate 450 being stacked over the first plate 460a, and the remaining of the heating medium flows in another direction (a clockwise direction when viewed from the top plane) centering on the through hole 463 along the heating medium passage P1, and then flows in the heating medium passage P1 inside the unit plate 450 through a through hole 462 formed at the first plate 460a being located at an opposite side against the second plate 460b and a through hole 453 formed at the second plate 450b of the unit plate 450 being stacked over the first plate 460a.

The heating medium, which flowed in the heating medium passage P1 of the unit plate 450, flows in another direction (a clockwise direction viewed from the top plane) centering on the through hole 452 along the heating medium passage P1, and then flows in a heating medium passage of a unit plate (not shown) being located over a first plate 450a through a though hole 451 formed at the first plate 450a being located at an opposite side against the second plate 450b.

As described above, according to the present embodiment, the unit plates 480 and 470 being located at a lower group are configured to direct the heating medium to flow in one direction (the counterclockwise direction when viewed from the top plane) along the heating medium passage P1, whereas the unit plates 460 and 450 being located at an upper group are configured to direct the heating medium to flow in another direction (the clockwise direction when viewed from the top plane) along the heating medium passage P1, thereby alternately changing the flow direction of the heating medium to form the passage to be long. And, the unit plates 450, 460, 470, and 480, which have been described as an example in the present embodiment, may be stacked in a plurality of unit sets to configure the heat exchange units 300 and 400.

Figure 18A:
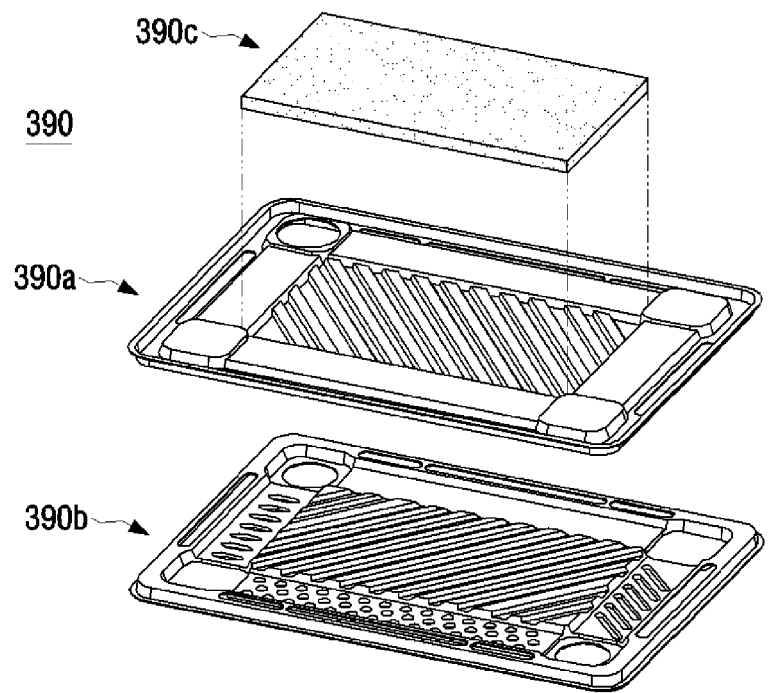
FIGS. 18A and 18B are an exploded perspective view and a coupled perspective view of one embodiment of a heat isolator provided at a boundary between a sensible-heat exchange unit and a latent-heat exchange unit, respectively.
Figure 18B:
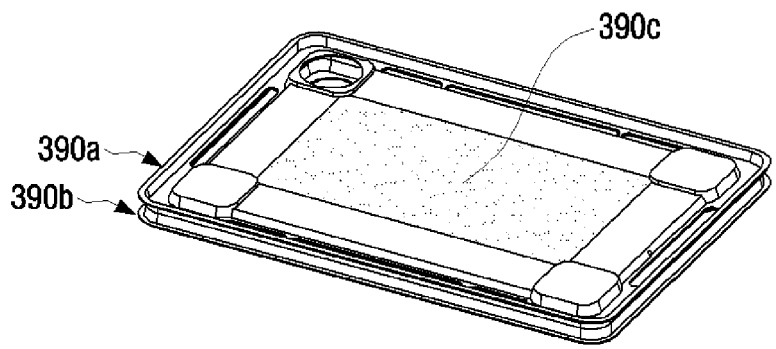

Meanwhile, as shown in FIG. 18, the heat isolator 390 may be configured to prevent combustion heat generated at the sensible-heat exchange unit 300 from being transferred to the latent-heat exchange unit 400 by filling a heating medium between the upper cover panel 390a and the lower cover panel 390b which are longitudinally stacked, and stacking an insulating material 390c on the upper cover panel 390a. In this case, the heating medium filled between the upper cover panel 390a and the lower cover panel 390b may serve to perform an insulation function so that the insulating material 390c may be selectively used as necessary.

Figure 19:
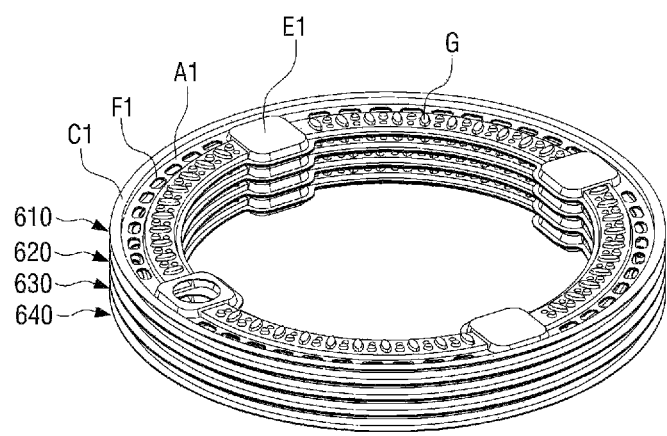
FIG. 19 is a perspective view of a stacked structure of unit plates according to still another embodiment of the present disclosure.

Although the above described embodiments have exemplified the unit plates which configure the heat exchange units 300 and 400 and are formed to surround the burner 200 in a quadrangular shape, the unit plates may be configured in a polygonal shape including a pentagonal shape and the like in addition to the quadrangular shape, and an oval shape. Further, as shown in FIGS. 19 and 20, unit plates 610, 620, 630, 640, and 650 may be arranged and configured in a circular shape.

Figure 20A:
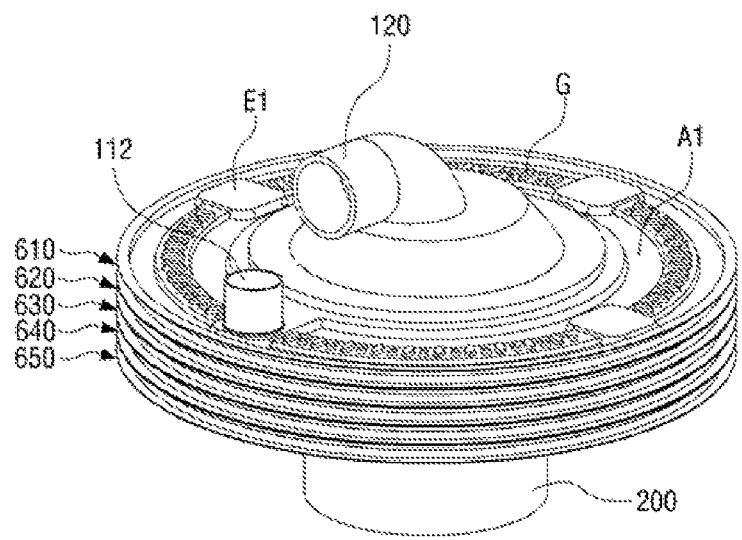
FIGS. 20A and 20B are a perspective view and a partially dissected perspective view of an embodiment in which a passage of a heating medium is additionally formed at an upper part of a burner, respectively.
Figure 20B:
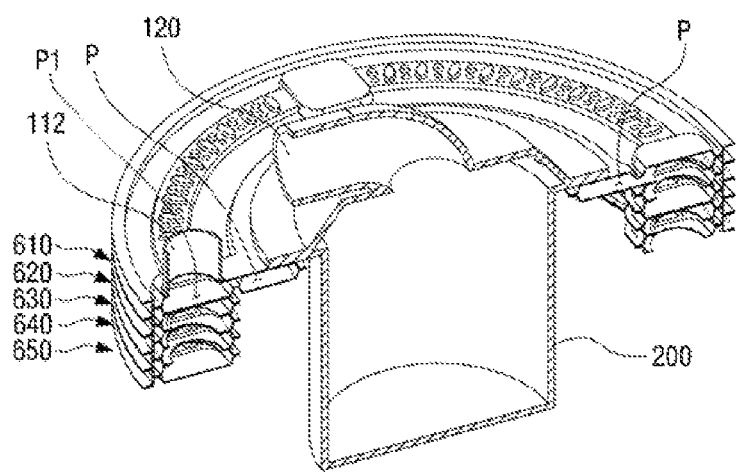

Meanwhile, as shown in FIG. 20, a heating medium connecting passage P may be additionally formed and configured at a lateral circumference of an upper part of the burner 200, wherein the heating medium connecting passage P is connected to the heating medium passage P1 located at the upper part of the burner 200, thereby allowing a heating medium to pass the heating medium connecting passage P.

With a configuration of the heating medium connecting passage P, it may prevent a burner supporting plate from being overheated by combustion heat transferred through the upper part of the burner 200, and the combustion heat of combustion gas may be absorbed by the heating medium passing the heating medium connecting passage P such that insulation and thermal efficiency may be more improved.

In the above described embodiments, although the heat exchange units 300 and 400 have been described as an example of a condensing type heat exchanger that is configured with the sensible-heat exchange unit 300 and the latent-heat exchange unit 400, it should be understood that the heat exchanger of the present disclosure may be applicable to a general heat exchanger in which heat exchange is performed using only combustion sensible heat as well as a condensing type heat exchanger.

As described above, the present disclosure is not limited to the described embodiments, and it should be construed that modifications can be apparently devised by those skilled in the art without departing from the technical spirit of this disclosure defined by the appended claims, and also such modifications will fall within the scope of this disclosure.

The invention claimed is:

1. A heat exchanger comprising:
   a mixture inflow unit 100 in which a mixture of air and fuel flows;
   a burner 200 configured to burn the mixture flowing in through the mixture inflow unit 100;
   heat exchange units 300 and 400 provided at a circumference of the burner 200, configured to exchange heat between combustion gas generated by combustion of the burner 200 and a heating medium, and configured with a plurality of unit plates being longitudinally stacked; and
   a combustion gas discharge unit 500 configured to discharge combustion gas that passed the heat exchange units 300 and 400,
   wherein the heat exchangers 300 and 400 are configured with a sensible-heat exchange unit 300 configured to absorb sensible heat of the combustion gas generated by the combustion of the burner 200, and a latent-heat exchange unit 400 configured to absorb latent heat of water vapor contained in the combustion gas being undergone heat exchange in the sensible-heat exchange unit 300, and
   wherein in each of the plurality of unit plates that are stacked to configure the sensible-heat exchange unit 300 and the latent-heat exchange unit 400, a heat medium flow path P1 and a combustion gas flow path P2 separated from each other and longitudinally and alternately formed to be adjacent to each other, a combustion gas discharge passage P3 for connecting the combustion gas passage P2 and the combustion gas discharge unit 500, and an outer wall structure for sealing the outer side surface of the combustion gas discharge passage P3 are integrally formed.

2. The heat exchanger of claim 1, wherein each of the plurality of unit plates is configured with a first plate and a second plate which are longitudinally stacked,
   wherein the first plate includes:
   a first plane portion A1 in which a first through hole B1 is formed at a central part thereof;
   a first flange portion C1 formed to extend from an edge of the first plane portion A1 to an upper side thereof to be bent to an outward side thereof; and
   a passage forming protruding portion D1 formed to be convex upward at a region between the edge of the first plane portion A1 and the first through hole B1, and
   wherein the second plate includes:
   a second plane portion A2 in which a second through hole B2 of a shape corresponding to that of the first through hole B1 is formed at a central part of the second plane portion A2, and having an upper surface coming into tight contact with a bottom surface of the first plane portion A1;
   a second flange portion C2 formed to extend from an edge of the second plane portion A2 to a lower side thereof to be bent to an outward side thereof, and coupled to a flange portion C1 of a unit plate being located below the second plate; and
   a passage forming depressed portion D2 formed to be concave downward at a region between the edge of the second plane portion A2 and the second through hole B2, thereby forming the heating medium passage P1 between the passage forming protruding portion D1 and the passage forming depressed portion D2.

3. The heat exchanger of claim 2, wherein the first flange portion C1 is formed to be higher than a protruding height of the passage forming protruding portion D1, and the second flange portion C2 is formed to be deeper than a depressed depth of the passage forming depressed portion D2, and thus a longitudinally separated space, which forms the combustion gas passage P2, is provided between a lower end of a passage forming depressed portion D2 of a unit plate being located at an upper group among unit plates that are longitudinally located to be adjacent to each other, and an upper end of a passage forming protruding portion D1 of a unit plate being located at a lower group thereamong.

4. The heat exchanger of claim 3, wherein a plurality of gap maintaining protruding portions E1, each of which protrudes at the same height as that of the first flange portion C1, are formed to be spaced apart from each other at the passage forming protruding portion D1 in a circumferential direction, and a plurality of gap maintaining depressed portions E2, each of which is depressed at the same depth as that of the second flange portion C2, are formed to be spaced apart from each other at the passage forming depressed portion D2 in the circumferential direction, and thus a lower end of each of the plurality of gap maintaining depressed portions E2 of a unit plate being located at the upper group among the unit plates being longitudinally located to be adjacent to each other, and an upper end of each of the plurality of gap maintaining protruding portions E1 of a unit plate being located at the lower group thereamong come into contact with each other.

5. The heat exchanger of claim 4, wherein the passage forming protruding portion D1 is formed to be communicated with an entire section at a region between the edge of the first plane portion A1 and the first through hole B1 along the circumferential direction, the passage forming depressed portion D2 is formed to be communicated with an entire section at a region between the edge of the second plane portion A2 and the second through hole B2 along the circumferential direction, and a through hole is formed at each of the plurality of gap maintaining protruding portions E1 and each of the plurality of gap maintaining depressed portions E2 so as to connect a heating medium passage P1 of the unit plate being located at the lower group to a heating medium passage P1 of the unit plate being located at the upper group,
wherein the through hole is located so as to reverse a direction of the heating medium passage P1 of the unit plate located at the lower group against that of the heating medium passage P1 of the unit plate located at the upper group.

6. The heat exchanger of claim 5, wherein a heating medium, which flows in through a through hole formed at one side of a second plate configuring the unit plate located at the lower group among the unit plates being longitudinally located to be adjacent to each other, is branched off to both directions to flow along the heating medium passage P1, and then passes a through hole formed at a first plate being located at an opposite side against the second plate and a through hole formed at a second plate configuring a unit plate being located at the upper group, thereby flowing in a heating medium passage P1 of the unit plate being located at the upper group.

7. The heat exchanger of claim 6, wherein multiple heating medium passages P1 are configured in parallel with each other by stacking the unit plate.

8. The heat exchanger of claim 4, wherein the passage forming protruding portion D1 is formed to be communicated with some section at a region between the edge of the first plane portion A1 and the first through hole B1 along the circumferential direction, the passage forming depressed portion D2 is formed to be communicated with some section at a region between the edge of the second plane portion A2 and the second through hole B2 along the circumferential direction, and a through hole is formed at each of the plurality of gap maintaining protruding portions E1 and each of the plurality of gap maintaining depressed portions E2 so as to connect a heating medium passage P1 of the unit plate located at the lower group to a heating medium passage P1 of the unit plate located at the upper group,
wherein the through hole is located so as to reverse a direction of the heating medium passage P1 of the unit plate located at the lower group against that of the heating medium passage P1 of the unit plate located at the upper group.

9. The heat exchanger of claim 8, wherein a heating medium, which flows in through a through hole formed at one side of a second plate configuring the unit plate located at the lower group among the unit plates being longitudinally located to be adjacent to each other, flows in one direction along the heating medium passage P1, and then passes a through hole formed at a first plate being located at an opposite side against the second plate and a through hole formed at a second plate configuring a unit plate being located at the upper group, thereby flowing in a heating medium passage P1 of the unit plate being located at the upper group.

10. The heat exchanger of claim 9, wherein multiple heating medium passages P1 are configured in parallel with each other by stacking the unit plate.

11. The heat exchanger of claim 3, wherein a combustion gas outlet F1 is formed at the edge of the first plane portion A1 to provide the combustion gas discharge passage P3, and a combustion gas outlet F2 is formed at a position, which longitudinally corresponds to the combustion gas outlet F1, on the edge of the second plane portion A2, and thus combustion gas, which passed the combustion gas passage P2, sequentially passes the combustion gas outlets F1 and F2, which are formed at each of the unit plates being longitudinally arranged, thereby flowing toward the combustion gas discharge unit 500.

12. The heat exchanger of claim 3, wherein a turbulent flow forming portion G having an irregular shape is formed at the passage forming protruding portion D1 or the passage forming depressed portion D2.

13. The heat exchanger of claim 12, wherein a protruding upper end and a depressed lower end of the turbulent flow forming portion G come into contact with each other inside the heating medium passage P1 and the combustion gas passage P2. configured in parallel with each other by stacking the unit plate.

14. The heat exchanger of claim 1, wherein a heat isolator 390 is provided between the sensible-heat exchange unit 300 and the latent-heat exchange unit 400 to spatially separate the sensible-heat exchange unit 300 and the latent-heat exchange unit 400 from each other, and thus the combustion gas generated by the combustion of the burner 200 passes the combustion gas passage P2 of the sensible-heat exchange unit 300 to flow in a radially outward direction, and then passes the combustion gas passage P2 of the latent-heat exchange unit 400 after passing the combustion gas discharge passage P3 to flow in a radially inward direction, thereby being discharged to the combustion gas discharge unit 500.

15. The heat exchanger of claim 14, wherein the heat isolator 390 includes:
a heating medium filled between an upper cover panel 390a and a lower cover panel 390b which are longitudinally stacked; and
an insulating material 390c stacked on the upper cover panel 390a.

16. The heat exchanger of claim 1, wherein the unit plate is arranged to surround the circumference of the burner 200 in a polygonal shape, a circular shape, or an oval shape.

17. The heat exchanger of claim 1, wherein a heating medium connecting passage P is formed at a lateral circumferential surface of an upper part of the burner 200, wherein the heating medium connecting passage P is connected to a heating medium passage P1 located at the upper part of the burner 200, thereby allowing the heating medium to pass the heating medium connecting passage P.

* * * * *